US009961386B1

(12) United States Patent
Thomas et al.

(10) Patent No.: US 9,961,386 B1
(45) Date of Patent: May 1, 2018

(54) SYSTEMS AND METHODS FOR NAVIGATING CUSTOM MEDIA PRESENTATIONS

(71) Applicant: Rovi Guides, Inc., San Carlos, CA (US)

(72) Inventors: William L. Thomas, Evergreen, CO (US); Margret B. Schmidt, Redwood City, CA (US); Ajay Kumar Gupta, Andover, MA (US); Alexander W. Liston, Menlo Park, CA (US); Jonathan A. Logan, Mountain View, CA (US); Mathew C. Burns, Dublin, CA (US); Gabriel C. Dalbec, Morgan Hill, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days. days.

(21) Appl. No.: 15/474,738

(22) Filed: Mar. 30, 2017

(51) Int. Cl.
| | |
|---|---|
| *H04N 21/431* | (2011.01) |
| *H04N 21/433* | (2011.01) |
| *H04N 21/435* | (2011.01) |
| *H04N 21/4402* | (2011.01) |
| *H04N 21/462* | (2011.01) |
| *H04N 21/262* | (2011.01) |
| *H04N 21/2343* | (2011.01) |
| *G06F 17/30* | (2006.01) |
| *H04N 21/61* | (2011.01) |
| *H04N 21/482* | (2011.01) |

(52) U.S. Cl.
CPC . *H04N 21/26258* (2013.01); *G06F 17/30038* (2013.01); *G06F 17/30041* (2013.01); *G06F 17/30053* (2013.01); *H04N 21/234345* (2013.01); *H04N 21/6125* (2013.01); *H04N 21/4821* (2013.01)

(58) Field of Classification Search
CPC ............. H04N 21/431; H04N 21/4332; H04N 21/4358; H04N 21/4402; H04N 21/4622
USPC ................................................ 725/47, 48, 52
See application file for complete search history.

(56) References Cited

U.S. PATENT DOCUMENTS

| | | | |
|---|---|---|---|
| 6,239,794 | B1 | 5/2001 | Yuen et al. |
| 6,388,714 | B1 | 5/2002 | Schein et al. |
| 6,564,378 | B1 | 5/2003 | Satterfield et al. |
| 6,756,997 | B1 | 6/2004 | Ward, III et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 2002/0174430 | A1 | 2/2002 | Ellis et al. |

(Continued)

*Primary Examiner* — Dominic D Saltarelli
(74) *Attorney, Agent, or Firm* — Haley Guiliano LLP

(57) ABSTRACT

Systems and methods for presenting custom navigation options are described herein. In some embodiments, the media guidance application displays a first portion of a media asset, and identifies a set of entities referenced in messages associated with the media asset. The media guidance application then selects an entity frequently referenced in the plurality of messages, and displays a transport bar associated with the entity comprising an indicator identifying the entity and a region associated with only portions of the media asset associated with the entity. The media guidance application then displays a second portion of the media asset in response to receiving a user selection of a segment of the region. In some embodiments, the region corresponds to a custom presentation of the media asset featuring the selected entity, and the transport bar updates dynamically based on newly received messages, or the content displayed by the media guidance application.

20 Claims, 12 Drawing Sheets

(56) References Cited

U.S. PATENT DOCUMENTS

| | | |
|---|---|---|
| 2003/0110499 A1 | 1/2003 | Knudson et al. |
| 2003/0149980 A1 | 8/2003 | Ellis |
| 2005/0251827 A1 | 7/2005 | Ellis et al. |
| 2010/0153885 A1 | 6/2010 | Yates |
| 2013/0294755 A1 | 11/2013 | Arme et al. |
| 2013/0311575 A1 | 11/2013 | Woods et al. |
| 2014/0281972 A1 | 9/2014 | Kramer et al. |

200

| Message ID | Message Text | Supplemental Content | Timestamp | Description of Associated Assets | ... |
|---|---|---|---|---|---|
| 1 | Jules is Cute! | | 12:15:00 pm 1-20-2017 | Romeo and Juliet in Paris | |
| 2 | Look at this Crazy Guy | Tophatman.jpg | 12:15:05 pm 1-20-2017 | Romeo and Juliet in Paris | |
| 3 | Why so serious? | SeriousMeme.gif | 12:16:20 pm 1-20-2017 | The Dark Knight | |
| ... | | | | | |

| Entity ID | Name of Entity | Entity Descriptors | Associated Asset | ... |
|---|---|---|---|---|
| 1 | Romeo | Romeo; Rom; Montague; | Romeo and Juliet in Paris; Romeo and Juliet in London | |
| 2 | Juliet | Juliet; Jules; Capulet | Romeo and Juliet in Paris; Romeo and Juliet in London | |
| 3 | Tophat Man | Tophat; Rich; Crazy | Romeo and Juliet in Paris | |
| 4 | Eiffel Tower | Eiffel; Tower; Paris Landmark; | Romeo and Juliet in Paris; The Man on the Eiffel Tower; Midnight in Paris; | |
| 5 | The Joker | Joker; Prince of Crime; Heath Ledger | The Dark Knight | |
| ... | | | | |

| Portion ID | Descriptor | Start Time | End Time | Featured Entities | Associated Asset | ... |
|---|---|---|---|---|---|---|
| 1 | Eiffel Tower Scene | 00:35:00 | 00:38:00 | Romeo; Juliet; Tophat Man; Eiffel Tower | Romeo and Juliet in Paris | |
| 2 | Dancing Scene | 00:46:15 | 00:58:01 | Romeo; Juliet | ~~ | |
| 3 | Tophat Man Cameo | 01:15:05 | 01:15:30 | Romeo; Tophat Man; | ~~ | |
| ... | | | | | | |

- 502 — Presentation Name: Romeo and Juliet's Romance
- 504 — Source Media Asset(s): Romeo and Juliet in Paris
- 506 — Display Sub-portions: True
- 508 — Sub-Portion Descriptors: Text
- 510 — Associated Entities: Romeo, Juliet
- 512 — Presentation Playlist:

| Order Within Presentation | Source Media Asset | Portion ID | Portion Description |
|---|---|---|---|
| 1 | Romeo and Juliet in Paris | 1 | Eiffel Tower Scene |
| 2 | Romeo and Juliet in Paris | 2 | Dancing Scene |
| 3 | Romeo and Juliet in Paris | 8 | Wedding Scene |
| ... | | | |

FIG. 5

SYSTEMS AND METHODS FOR NAVIGATING CUSTOM MEDIA PRESENTATIONS

BACKGROUND

Video programs and other media are traditionally presented in a single, linear fashion. For example, television content is often designed for viewers to watch episodes in order, starting from the first episode of the first season and ending with the last episode of the last season. While viewers could randomly decide to watch episodes out of order, there is little value in doing so, since viewers will likely be presented with a disorganized jumble of different plotlines and unrelated vignettes. As a result, conventional systems either require users to have foreknowledge of exactly which subsets of content they would like to consume, or force users to consume media in a particular predetermined order in order to have a meaningful and enjoyable experience.

SUMMARY

Accordingly, systems and methods are presented for allowing users to use a media guidance application to view and navigate customized media presentations, thereby allowing users a way to view subsets of media content pre-arranged in a cohesive fashion. The systems and methods may be used to present users with the opportunity to view portions of media related to particular characters, actors, locations, or other customized parameters. These opportunities may be created and presented to the user dynamically, based on the content being presented to the user, known user preferences, received messages, popular discussion topics on social media, or any other convenient means. Users may also be able to create customized presentations to share with others, based on either pre-defined or dynamic templates. A media guidance application utilizing these systems and methods may therefore provide users with new and interesting ways to consume existing media content through the use of custom presentations, and create a more engaging user experience.

In some aspects, a media guidance application may generate for display a first portion of a media asset. For example, the media guidance application may display a portion of a television show, film, book, video-game cut scene, or other type of visual media. In general, the first portion of the media asset may be displayed by the media guidance application concurrently with any number of other menus, overlays, or other graphics.

The media guidance application then searches, using data indicative of the media asset, a message database to identify a plurality of messages associated with the media asset. For example, if the media asset is the film "Romeo and Juliet in Paris," the media guidance application may use the name of the film to search a message database for messages related to the film "Romeo and Juliet in Paris." Other types of data indicative of the media asset may be images from the media asset, audio samples from the media asset, audio or video fingerprint information, or media guidance data such as a media identifier. In general, the message database may be a local database, or a remote database. The message database may be populated with messages taken from social media communications, online blogs, forums, fan pages, Internet websites, or the like. The messages in the database may include text, or supplemental content such as video, images, uniform resource locators (URLs), hyperlinks, message metadata, or the like. The messages in the database may be categorized according to the media assets associated with each of the messages, allowing the media guidance application to easily search for and retrieve any messages associated with the media asset. For example, the database may have an API that may be used by the media guidance application to request the messages, or the database may respond to appropriately formatted search queries or SQL commands that include the data indicative of the media asset.

The media guidance application then searches, using message content from the plurality of messages, an entity database to identify a set of entities referenced in the plurality of messages. For example, if the messages relate to the film "Romeo and Juliet in Paris," the messages may mention a particular character in the film, locations in the film, actors portraying characters in the film, objects and scenes within the film, or the like. In general, a set of entities referenced in the film may be contained within an entity database, along with descriptors for each of the entities. For example, the character "Juliet" may be stored in the entity database along with various descriptors that may be used to refer to the character, such as variations of the character's first and last name: "Juliet," "Jules," and "Capulet." In this case, the media guidance application may compare the content from the messages to the descriptors for the entities listed in the database, and include "Juliet" in the set of entities if any of the messages include text with the descriptors "Juliet," "Jules," or "Capulet."

In some embodiments, the media guidance application may search the entity database by identifying strings of text associated with the message content from the plurality of messages. For example, there may be one or more strings of text included within the message. Alternately, if the message includes supplemental content, such as video, audio, uniform resource locators (URLs), or hyperlinks, text may be extracted from that supplemental content using any number of techniques and included with the identified strings of text. The media guidance application then compares the strings of text to entries in the entity database, each of the entries comprising an associated entity and at least one descriptor of the associated entity. For example, if one of the strings of text was "Jules is cute!," that string of text may be compared against the database of entities to identify entries with descriptors similar to the text. The media guidance application then includes the associated entity of an entry in the set of entities in response to determining that at least a portion of the strings of text match at least a portion of the at least one descriptor of the entry. For example, if one of the strings of text was "Jules is cute!," the media guidance application may determine that a portion of the string of text matches the descriptor "Jules," which is part of the database entry associated with the entity "Juliet." In this case, the entity "Juliet" associated with the entry may be included by the media guidance application in the set of entities.

The media guidance application then determines, for the set of entities, a set of frequencies indicative of how often each entity in the set of entities is referenced in the plurality of messages. For example, if the set of entities included "Romeo," "Juliet," and "Eiffel Tower," the set of frequencies may indicate that 50% of the messages refer to "Romeo" and "Juliet," and 25% of the messages refer to the "Eiffel Tower." The media guidance application may determine the frequencies any number of ways. For example, the media guidance application may determine the number of messages that include text that matches a descriptor for a given entity, and divide this number by the total number of messages analyzed.

In some embodiments, the media guidance application determines the set of frequencies by identifying strings of text associated with the message content from the plurality of messages.

For example, the media guidance application may identify one or more strings of text included within the message, or identify strings of text from supplemental content included in the message. The media guidance application then determines, for each entity in the set of entities, a number of the strings of text that include a descriptor of the entity. For example, the media guidance application may determine that ten of the twenty identified strings reference the entity "Romeo," and five of the identified strings reference the entity "Juliet." The media guidance application then assigns, for each entity in the set of entities, a frequency in the set of frequencies based on the number. For example, the media guidance application may divide the number by the total number of identified strings to express the frequency as a percentage. In this case, the media guidance application may store a set of frequencies indicating that the entity "Romeo" was referenced in 50% of the identified strings, and "Juliet" was referenced in 25% of the identified strings. In some embodiments, the media guidance application may also store the set of frequencies by ranking the entities from the most frequent to the least frequently referenced. For example, the entity "Romeo" may be assigned a "1" as the entity most frequently referenced in the plurality of messages, and the entity "Juliet" may be assigned a "2" as the entity second most frequently referenced in the plurality of messages.

The media guidance application then selects, from the set of entities, an entity frequently referenced in the plurality of messages. For example, if the media guidance application determines that "Romeo" is the most frequently referenced entity in the set of entities, "Romeo" may be selected. As an alternate example, the media guidance application may select at random from a subset of entities that have an associated frequency above a threshold value. For example, the media guidance application may select any entity in the set of entities that has a frequency above 30%, or any of the three most frequently referenced entities.

In some embodiments, the media guidance application selects an entity by identifying, from the set of entities, a subset of entities presented in the first portion of the media asset. For example, the set of entities may include "Romeo," "Juliet," "Mercutio," and "Tybalt." If the media guidance application determines that the first portion of the media asset features only the entities "Romeo" and "Juliet," and not "Mercutio" or "Tybalt," the media guidance application will select a subset of entities that includes only "Romeo" and "Juliet." The media guidance application then selects the entity from the subset of entities. For example, the media guidance application may select the entity from the subset of entities that includes only "Romeo" and "Juliet."

The media guidance application then identifies, using a media asset portion database, one or more portions of the media asset associated with the entity. For example, if the media guidance application selected "Romeo" as the entity, the media guidance application may search the media asset portion database for portions of the media asset associated with the entity "Romeo." The media asset portions in the media asset portion database may be categorized according to which entities are featured within the portion, allowing the media guidance application to easily search for and retrieve media asset portions featuring a given entity. For example, the database may have an API that may be used by the media guidance application to identify and retrieve the media asset portions, or the database may respond to appropriately formatted search queries or SQL commands.

In some embodiments, the media guidance application identifies one or more portions of the media asset associated with the entity by accessing the media asset portion database, the entries in the media asset portion database comprising an associated portion of the media asset, a start time of the associated portion, an end time of the associated portion, and a list of entities depicted in the associated portion. For example, a typical entry in the database may be for a particular portion of the media asset "Romeo and Juliet in Paris." The entry may include a description of the portion "Dancing Scene," the original start and end time of the portion within the original media asset, and a list of entities featured in the portion, including the characters "Romeo" and "Juliet." The media guidance application then selects a plurality of entries from the media asset portion database, each of the selected entries comprising the entity in the list of entities. For example, if the entity was "Romeo," the media guidance application would select database entries that include "Romeo" in the list of entities. The media guidance application then selects, as the one or more portions of the media asset associated with the entity, associated portions of the media asset from the plurality of entries selected. For example, if the media guidance application selected the database entry associated with the portion "Dancing Scene," that portion of the media asset would be selected as one of the portions of the media asset associated with the entity "Romeo."

In some embodiments, the media guidance application identifies one or more portions of the media asset associated with the entity by accessing a database of media asset playlists, each entry in the database comprising an associated playlist of media asset portions, and a list of entities depicted in the media asset portions. For example, an entry in the database may be for a playlist of media asset portions featuring the entities "Romeo" and "Juliet." The media guidance application then selects, from the database, an entry, wherein the entity is included in the list of entities of the entry selected. For example, if the entity was "Romeo," the entry representing a playlist of media asset portions featuring the entities "Romeo" and "Juliet" may be selected. The media guidance application then identifies media asset portions within the associated playlist of the entry selected as the one or more portions of the media asset associated with the entity. For example, if the media guidance application selected an entry for a playlist of media asset portions featuring the entities "Romeo" and "Juliet," the media asset portions within the playlist would be selected.

The media guidance application then generates a custom presentation of the media asset by arranging the one or more portions of the media asset associated with the entity in an order. For example, if the media guidance application identified portions of the media asset featuring the entity "Romeo," those identified portions of the media asset may be arranged together into a single custom presentation. The order may be based on the original presentation order of the identified portions of the media asset. For example, the portions of the media asset that are normally presented earlier in the original media asset may be arranged earlier in the custom presentation. As an alternate example, the order of the media asset portions may be selected to conform to a user description of the media asset, or chronologically according to the sequence of events portrayed within the media asset. For instance, a convoluted plotline involving several flashbacks and flash-forwards may be arranged chronologically, rather than in the order that they are normally presented in the original media asset.

The media guidance application then generates for display a transport bar associated with the entity, the transport bar comprising an indicator identifying the entity and only one or more regions associated with the custom presentation. For example, if the entity is the character "Romeo," the indicator may be the name of the character, an image of the character's face, an image of a distinguishing feature of the character such as his clothing or accessories, a color-coded highlight region matching a highlight region presented around the character in the media asset, or any other suitable type of visual indicator. The one or more regions may represent the custom presentation, and may allow the user to navigate to different media asset portions of the custom presentation. In some embodiments, the region comprises a plurality of sub-regions, each of the sub-regions being associated with a different portion of the media asset within the custom presentation. For example, if the custom presentation includes five distinct portions of the media asset, each of those five portions may be represented by a distinct sub-region within the transport bar. In general, the region may also include an indicator of the current play position within the custom presentation.

The media guidance application then receives a user selection of a segment of the region. For example, a user may use a mouse, keyboard, remote control, voice commands, gestures, or other suitable input to select a segment of the region. For instance, the user may use a mouse to select a particular segment of the region, and the media guidance application may receive the user selection of that segment. In some embodiments, when the region is divided into sub-regions, the user selection of the segment of the region indicates one of the plurality of sub-regions. For example, a user may use a remote control to highlight and select one of the plurality of sub-regions, and the media guidance application may receive the user selection of that sub-region.

The media guidance application then generates for display a second portion of the media asset associated with the entity in response to receiving the user selection, the second portion of the media asset being a portion of the custom presentation associated with the segment of the region selected. For example, if the selected segment indicated a particular play position within the custom presentation, the media guidance application may begin displaying the media asset starting from that play position. In some embodiments, when the selected segment indicates a sub-region, the second portion of the media asset is associated with the sub-region indicated by the user selection. For example, if the user selection indicated the sub-region representing the "wedding" portion of the media asset "Romeo and Juliet in Paris," the media guidance application may generate a display of the "wedding" portion of the media asset "Romeo and Juliet in Paris."

In some embodiments, the media asset is a first media asset, and the media guidance application identifies, using a media asset portion database, one or more portions of a second media asset associated with the entity. For example, if the entity is "Romeo," and the first media asset is the film "Romeo and Juliet in Paris," the media guidance application may identify portions of a second media asset also associated with the entity "Romeo," such as the portions of the film "Romeo and Juliet in London." The media guidance application then generates a second custom presentation of the second media asset by arranging the one or more portions of the second media asset associated with the entity in a second order. For example, if the media guidance application selected portions of the film "Romeo and Juliet in London," the media guidance application may generate a second custom presentation by arranging the selected portions in chronological order. The media guidance application then generates for display a second transport bar associated with the entity, the second transport bar comprising the indicator identifying the entity and a second region associated with only the second custom presentation. For example, the media guidance application may display a second transport bar identifying the entity "Romeo," and including a second region associated with the second custom presentation generated from portions of the film "Romeo and Juliet in London."

In some embodiments, the media guidance application generates a third custom presentation by arranging the one or more portions of the first media asset and the one or more portions of the second media asset in a third order. For example, the media guidance application may arrange portions of both of the films "Romeo and Juliet in Paris," and "Romeo and Juliet in London," into a single custom presentation. The media guidance application then generates for display a third transport bar associated with the entity, the third transport bar comprising the indicator identifying the entity and a third region associated with only the third custom presentation. For example, the media guidance application may display a third transport bar that identifies the entity "Romeo," and includes a region associated with the custom presentation generated from portions of both of the films "Romeo and Juliet in Paris," and "Romeo and Juliet in London."

In some embodiments, the entity is a first entity, and the media guidance application selects, from the set of entities, a second entity frequently referenced in the plurality of messages. For example, if the first entity is the entity "Romeo," the media guidance application may select the entity "Juliet" as the second entity frequently referenced in the plurality of messages. The media guidance application then identifies, using the media asset portion database, one or more portions of the media asset associated with both the first entity and the second entity. For example, the media guidance application may identify portions of the media asset "Romeo and Juliet in Paris" featuring both of the entities "Romeo" and "Juliet." The media guidance application then generates a second custom presentation of the media asset by arranging the one or more portions of the media asset associated with both the first entity and the second entity in a second order. For example, the media guidance application may have identified portions of the film "Romeo and Juliet in Paris" featuring both of the entities "Romeo" and "Juliet, and may generate a custom presentation by arranging those portions in chronological order. The media guidance application then generates for display a second transport bar associated with both the first entity and the second entity, the second transport bar comprising a second indicator identifying both the first entity and the second entity and a second region associated with only the second custom presentation. For example, the media guidance application may display a transport bar that includes an indicator identifying both "Romeo" and "Juliet," and a region representing the custom presentation generated from portions of the film "Romeo and Juliet in Paris" featuring both of the entities "Romeo" and "Juliet."

In some aspects, a media guidance application may generate for display a first portion of a media asset. For example, the media guidance application may display a portion of a movie, video-on-demand, or other type of visual media. In general, the first portion of the media asset may be displayed by the media guidance application concurrently with any number of other menus, overlays, or other graphics.

The media guidance application then receives a first user selection of an entity depicted within the first portion of the media asset. For example, if the media asset is the film "Romeo and Juliet in Paris," featuring the character "Romeo," the media guidance application may receive a user selection of the entity "Romeo."

In some embodiments, the media guidance application may receive the first user selection by receiving a user input. For example, the user input may be in the form of a verbal command spoken by the user into a microphone connected to user equipment implementing the media guidance application. The media guidance application may then determine a string of text associated with the user input. For example, the media guidance application may convert the audio of the user's verbal command to a string of text by using a suitable speech recognition technique, and determine that the verbal command corresponds to the string of text "show me more of Romeo." The media guidance application may then compare the string of text to entries in an entity database, each of the entries comprising an associated entity and at least one descriptor of the associated entity. For example, the media guidance application may compare the string of text "show me more of Romeo" to the entries in the entity database. The media guidance application may then, in response to determining that at least a portion of the string of text matches at least a portion of the at least one descriptor of a matching entry, determine the associated entity of the matching entry is the entity selected. For instance, if the media guidance application determines that the string of text "show me more of Romeo" partially matches a descriptor for the entry in the database corresponding to the entity "Romeo," the media guidance application may determine that the first user selection was a selection of the entity "Romeo."

The media guidance application may then, in response to receiving the first user selection, access a custom presentation database comprising a plurality of entries that each include a respective playlist of media asset portions and a respective associated entity featured in all media asset portions of the respective playlist of media asset portions. For example, if the first user selection was a selection of the entity "Romeo," the media guidance application may access a custom presentation database. In general, each entry in the database may contain a listing of entities associated with the custom presentation, and a playlist of media asset portions that feature that entity. For example, one entry may represent a custom presentation associated with the entity "Romeo," and include a playlist of portions of the film "Romeo and Juliet in Paris" that feature the entity "Romeo."

The media guidance application may then identify, from a plurality of entries, a matching entry with an associated entity that matches the entity. For example, if the first user selection was a selection of the entity "Romeo," the media guidance application may identify an entry representing a custom presentation associated with the entity "Romeo."

The media guidance application may then retrieve a playlist of media asset portions from the matching entry. For example, if the identified entry represented a custom presentation associated with the entity "Romeo," the media guidance application may retrieve a playlist of portions of the film "Romeo and Juliet in Paris" that feature the entity "Romeo" from within the entry.

In some embodiments, the media asset is a first media asset, and at least one of the media asset portions of the playlist of media asset portions is associated with a second media asset distinct from the first media asset. For example, the media guidance application may retrieve a playlist from the entry that includes portions of the film "Romeo and Juliet in Paris" featuring the entity "Romeo," as well as portions of the film "Romeo and Juliet in London," also featuring the entity "Romeo."

The media guidance application may then generate for display a transport bar associated with the entity, the transport bar comprising an indicator identifying the entity and only one or more regions associated with the playlist of media asset portions. For example, the media guidance application may display a transport bar associated with the entity "Romeo." The displayed transport bar may include an indicator identifying the entity "Romeo" through the use of the entity's name, an image of the entity, a special graphic or highlight color associated with the entity, or any other suitable visual indicator. In general, the one or more regions may represent the portions of the media asset in the playlist of media asset portions, and may allow the user to navigate to different media asset portions.

In some embodiments, the region comprises a plurality of sub-regions, each of the sub-regions being associated with a respective one of the media asset portions of the playlist of media asset portions. For example, there may be a first sub-region associated with a first media asset portion, and a second sub-region associated with the second media asset portion. In general, the media guidance application may visually distinguish between the different sub-regions.

In some embodiments, the plurality of entries each include a respective indication of a transport bar display style, and the media guidance application may generate the display of the transport bar by retrieving an indication of a transport bar display style from the matching entry. For example, the custom presentation associated with the entity "Romeo" may include information indicating that a transport bar associated with the custom presentation is to be displayed as a thin bar with a red border, and the name of the entity "Romeo" indicated using large lettering. The media guidance application then generates for display the transport bar based on the indication of the transport bar display style, wherein the transport bar display style indicates at least one of a color, shape, or font to be associated with the transport bar. For instance, the media guidance application may generate a display of a transport bar based on the identified custom presentation associated with the entity "Romeo" by displaying the transport bar as a thin bar with a red border, and the name of the entity "Romeo" indicated using the large lettering indicated in the entry.

In some embodiments, when the region comprises a plurality of sub-regions, the media guidance application generates for display the transport bar by determining a respective asset portion display style for each of the media asset portions in the playlist of media asset portions from the matching entry. For example, within the identified custom presentation associated with the entity "Romeo" there may be information indicating that a sub-region of the transport bar associated with the "Dancing Scene" portion of the media asset is to be displayed as a green bar, and another portion of the media asset is to be displayed as a different color bar. The media guidance application may then generate for display the transport bar comprising the plurality of sub-regions, the display of each of the sub-regions being based on the respective asset portion display style, wherein each of the respective asset portion display styles indicates at least one of a color, shape, or font to be associated with a respective sub-region. For example, the media guidance application may display the transport bar, and display sub-region of the transport bar associated with the "Dancing Scene" using the green bar indicated in the entry.

In some embodiments, the media guidance application determines the respective asset portion display style for each of the media asset portions by determining, for each of the media asset portions, a respective type of activity involving the entity depicted by the media asset portion. For example, the media guidance application may determine if a given portion of the media asset involves characters fighting, dancing, engaging in romantic activities, or engaging in dialogue. The media guidance application may then determine, for each of the media asset portions, the asset portion display style based on the respective type of activity involving the entity. For instance, the media guidance application may determine that the "Dancing Scene" portion of the film "Romeo and Juliet in Paris" is to be associated with a sub-region of the transport bar displayed as a green bar, while a portion of the media asset featuring the death of the entity "Romeo" is to be displayed as a dark purple bar.

In some embodiments, the media guidance application determines the respective asset portion display style for each of the media asset portions by determining, for each of the media asset portions, whether a respective media asset portion is available from a content provider. For example, the media guidance application may determine if a given portion of the media asset is available from a digital video recorder "DVR" within the user's home. The media guidance application may then determine a first asset portion display style for the respective media asset portion in response to determining that the respective media asset portion is available from the content provider. For instance, the media guidance application may determine that the available media asset portions are to be displayed as a green bar. Alternately, the media guidance application may determine a second asset portion display style for the respective media asset portion in response to determining that the respective media asset portion is not available from the content provider. For instance, the media guidance application may determine that the media asset portions that are not available are to be displayed as a greyed-out bar.

In some embodiments, the entity is a first entity, the matching entry is a first matching entry, the playlist of media asset portions is a first playlist of media asset portions, the transport bar is a first transport bar, and the media guidance application receives an additional user selection of a second entity depicted within the first portion of the media asset. For example, the media guidance application may receive an additional user selection of the entity "Juliet," in addition to the first user selection of the entity "Romeo." In response to receiving the additional user selection, the media guidance application may identify, from a plurality of entries of the custom presentation database, a second matching entry with a first associated entity that matches the first entity, and a second associated entity that matches the second entity. For example, the media guidance application may select an entry associated with both the entity "Romeo" and the entity "Juliet," which may correspond to a custom presentation featuring a playlist of media asset portions that feature both the entity "Romeo" and the entity "Juliet." The media guidance application may then retrieve a second playlist of media asset portions from the second matching entry. For example, the media guidance application may retrieve the playlist of media asset portions that feature both the entity "Romeo" and the entity "Juliet." The media guidance application may then generate for display a second transport bar associated with both the first entity and the second entity, the second transport bar comprising an indicator identifying both the first entity and the second entity, and only one or more regions associated with the second playlist of media asset portions. For example, the media guidance application may display a transport bar that includes an indicator identifying both "Romeo" and "Juliet," and a region representing the portions of the film "Romeo and Juliet in Paris" in the second playlist, which features both of the entities "Romeo" and "Juliet."

The media guidance application may then receive a second user selection, the second user selection being a selection of a segment of the region. For example, a user may use a mouse, keyboard, remote control, voice commands, gestures, or other suitable input to select a segment of the region. For example, the user may verbally indicate a segment of the region to be selected, and the media guidance application may parse the input in order to determine the selected segment of the region.

The media guidance application may then generate for display a second portion of the media asset associated with the entity in response to receiving the second user selection, the second portion of the media asset being a portion of the custom presentation associated with the segment of the region selected by the second user selection. For example, if the second user selection indicated a segment of the region associated with the "Dancing Scene" portion of the film "Romeo and Juliet in Paris," the media guidance application may generate a display to be presented to the user that includes the "Dancing Scene" portion of the film.

In some embodiments, when the region includes a plurality of sub-regions, the second user selection indicates one of the plurality of sub-regions. For example, the second user selection may indicate a particular sub-region associated with a given portion of the media asset. In this case, the second portion of the media asset may be associated with the sub-region indicated by the second user selection.

In some embodiments, the media guidance application generates the display of the second portion of the media asset by determining a content source associated with the second portion of the media asset. For example, the media guidance application may determine that the second portion of the media asset is accessible from a digital video recorder (DVR) located within a user's home, or from an over-the-top (OTT) content provider. The media guidance application may then retrieve the second portion of the media asset from the content source. For instance, if the media guidance application determined that the second portion of the media asset is available from a particular OTT content provider, the media guidance application may retrieve the second portion of the media asset from that particular OTT content provider. The media guidance application may then generate for display the second portion of the media asset. For example, after retrieving the appropriate video files from the OTT content provider, the media guidance application may use those files in order to generate a display of the second portion of the media asset for user consumption.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative message database, which may be used in accordance with some embodiments of the disclosure;

FIG. 3 shows an illustrative entity database, which may be used in accordance with some embodiments of the disclosure;

FIG. 4 shows an illustrative media asset portion database, which may be used in accordance with some embodiments of the disclosure;

FIG. 5 shows an illustrative custom presentation, which may be used in accordance with some embodiments of the disclosure;

DETAILED DESCRIPTION

Figure 1:
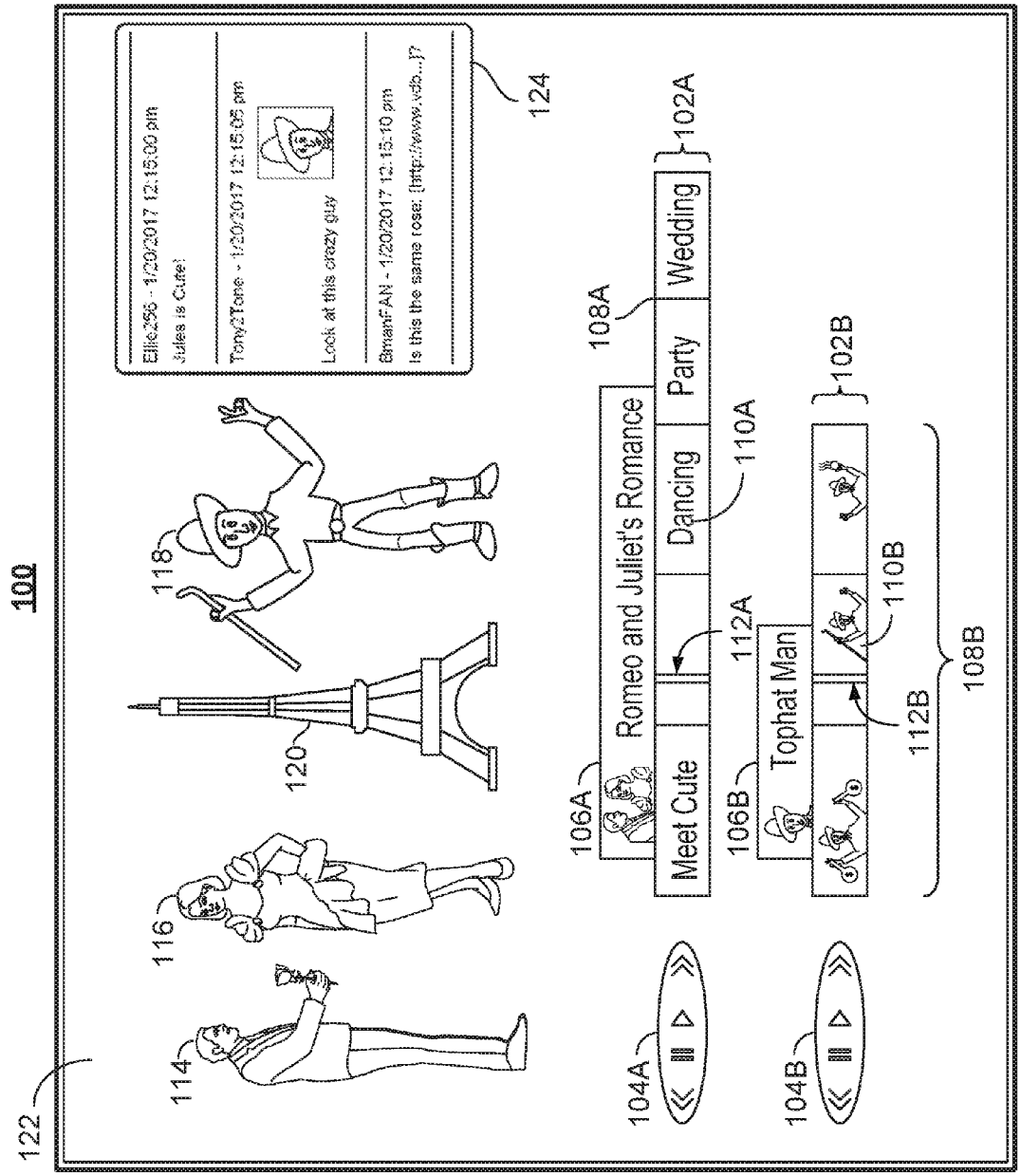
FIG. 1 shows an illustrative example of an interface for viewing and navigating customized media presentations, in accordance with some embodiments of the disclosure.

Systems and methods are presented for allowing users to use a media guidance application to view and navigate customized media presentations, thereby allowing users a manner to view subsets of media content pre-arranged in a cohesive fashion. The systems and methods may be used to present users with the opportunity to view portions of media related to particular characters, actors, locations, or other customized parameters. These opportunities may be created and presented to the user dynamically, based on the content being presented to the user, known user preferences, popular discussion topics on social media, or any other convenient means. Users may also be able to create customized presentations to share with others, based on either pre-defined or dynamic templates. A media guidance application utilizing these systems and methods may therefore provide users with new and interesting ways to consume existing media content through the use of custom presentations, and create a more engaging user experience.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1 shows an illustrative example of an interface for viewing and navigating customized media presentations, in accordance with some embodiments of the disclosure. Display screen 100 may be generated for display by a media guidance application, or by another application or device running in tandem with the media guidance application. Display screen 100 may be displayed, for instance, on a monitor or television display connected to a set-top box running the media guidance application (e.g., display 912 (FIG. 9)). Display screen 100 includes content display area 122, where portions of a media asset may be displayed. In general, content display area 122 may display content requested by the user, or it may display whatever content is being broadcast by a channel currently being tuned to or otherwise presented by the media guidance application.

The portion of a media asset displayed in content display area 122 may include one or more entities 114-120. For illustrative purposes, entities 114-120 in FIG. 1 are depicted as characters or objects depicted within the media asset. For example, in FIG. 1 the media guidance application generates a display with a portion of the film "Romeo and Juliet in Paris" in content display area 122, and entities 114-120 correspond to the character "Romeo" 114, the character "Juliet" 116, the character "Tophat Man," 118 and the object "Eiffel Tower" 120. However, the entities may also be locations appearing within the media asset, a real life location where a portion of the media asset was created, an actor within the media asset, a particular plot line or subject depicted by the media asset, or the like. In general, content display area 122 may fill any portion of display screen 100, and in some embodiments may fill the entirety of display screen 100. In some embodiments, the other portions of display screen 100, such as optional message region 124 or transport bars 102A and 102B, may be overlaid on top of content displayed within content display area 122. In some embodiments, the other portions of display screen 100, such as optional message region 124 or transport bars 102A and 102B, may be displayed in response to a media guidance application receiving user input. For example, a transport bar 102B associated with the entity "Tophat Man" may be generated for display by a media guidance application in response to receiving a user selection (e.g., via user input interface 910) of the entity "Tophat Man."

In some embodiments, display screen 100 may also include a message region 124. In general, message region 124 may contain messages related to the media asset presented in content display area 122. In some embodiments, the messages displayed by the media guidance application in message region 124 may be communications from a messaging service or social media service, such as Facebook™, Twitter™, or the like. In some embodiments, the messages displayed by the media guidance application in message region 124 may be messages retrieved from an Internet website, messages received by a user device, or the like.

In order to create custom navigation options, the media guidance application may identify a set of entities referenced in messages associated with the media asset. In some embodiments, the media guidance application may make use of a message database (e.g., database 200 (FIG. 2)), and incorporate one or more steps from process 1300 (FIG. 13) in order to identify entities referenced in messages associated with the media asset. For example, if the media asset presented in content display area 122 is a portion of the film "Romeo and Juliet in Paris," the media guidance application may identify a set of entities referenced in messages associated with the film "Romeo and Juliet in Paris." This may include, for instance, any of entities 114-118 that are referenced in the messages presented in message region 124.

The media guidance application then selects an entity frequently referenced in the plurality of messages, and generates a display of a transport bar (e.g., transport bar 102A or 102B) associated with the entity. For example, the media guidance application may determine that the character "Tophat Man" 118 is an entity frequently referenced in the plurality of messages, and generate for display transport bar 102B associated with the character "Tophat Man" 118. In some embodiments, the media guidance application may make use of an entity database (e.g., database 300 FIG. 3) in conjunction with message content from the plurality of messages in order to determine an entity frequently referenced in the plurality of messages.

In general, transport bars 102A and 102B may have an indicator 106A and 106B identifying one or more entities associated with the transport bars 102A and 102B. The transport bars 102A and 102B may also have regions 108A and 108B associated with portions of the media asset associated with the entity. For example, transport bar 102B associated with the character "Tophat Man" 118 may have indicator 106B identifying the character "Tophat Man" 118, and a region 108B associated with portions of the media asset featuring the character "Tophat Man" 118. Transport bars 102A and 102B may also include navigation icons 104A and 104B, and play position indicators 112A and 112B. For example, navigation icons 104A may allow a user to request to pause or resume playback of the portion of the media asset presented in content display area 122. Navigation icons 104A may also allow the user to request to fast forward, rewind, skip, or perform other trick operations with respect to the portions of the media asset associated with region 108A. In general, play position indicators 112A and 112B may represent the portion of the media asset associated with regions 108A and 108B currently presented in the content display area 122.

In general, a media guidance application may generate a display (e.g., display screen 100) including transport bars 102A or 102B in order to present navigation options for a custom presentation of the media asset. In general, this custom presentation may be generated by a media guidance application out of portions of the media asset featuring a particular character, plotline, location, or other suitable entity. In some embodiments, these custom presentations, and the corresponding display of an associated transport bar, may be generated by a media guidance application in response to user input, in response to a received set of messages, or in response to any other suitable stimuli. For example, a media guidance application may receive a verbal command to "show me scenes involving Tophat Man," and the media guidance application may parse this command (e.g., using a suitable speech recognition technique), determine that the user requested a custom presentation involving the entity "Tophat Man," and generate a display of a transport bar associated with the entity (e.g., transport bar 102B) with a region 108B associated with the custom presentation containing portions of the media asset featuring the entity "Tophat Man."

Figure 14:
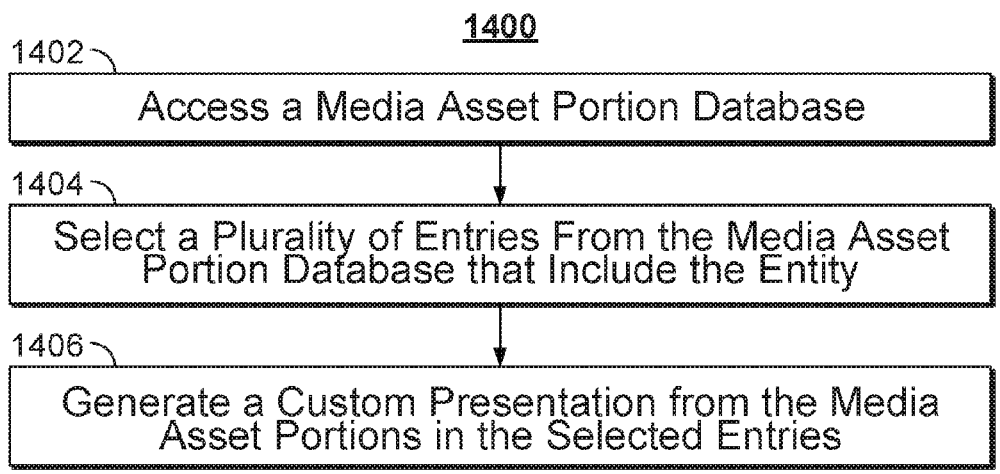
FIG. 14 is a flowchart of illustrative steps for using a media asset portion database to generate a custom presentation, in accordance with some embodiments of the disclosure.
Figure 15:
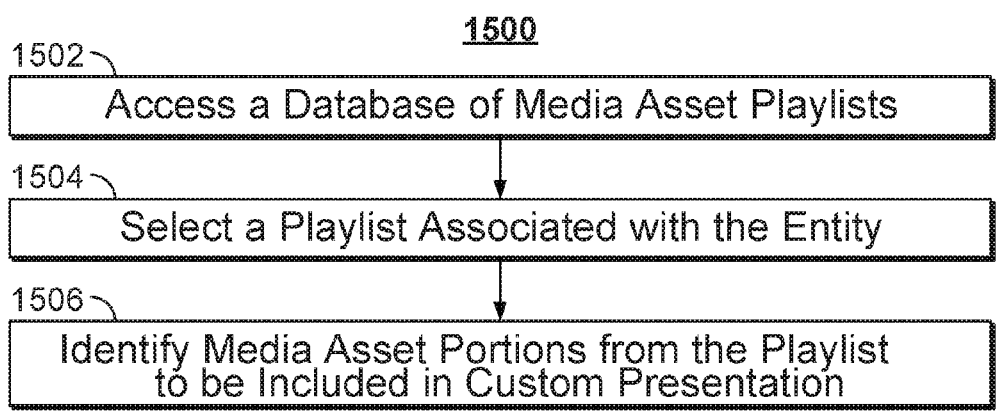
FIG. 15 is a flowchart of illustrative steps for using playlists to identify media asset portions to be included in a custom presentation, in accordance with some embodiments of the disclosure.

In some embodiments, the media guidance application may select the portions of the media asset associated with regions 108A and 108B from a media asset portion database (e.g., database 400 FIG. 4), and incorporate one or more steps from process 1400 (FIG. 14) or process 1500 (FIG. 15). In some embodiments, regions 108A and 108B may also represent a custom presentation of the media asset. Custom presentations are discussed further in relation to FIG. 5 and FIG. 6.

In some embodiments, the regions 108A and 108B may be divided into sub-regions (e.g., sub-regions 110A and 110B) representing different portions of the media asset. For example, sub-region 110A represents a portion of the media asset where the characters "Romeo" 114 and "Juliet" 116 are depicted dancing together. In general, different sub-regions may include a visual indicator of a portion of the media asset associated with each respective sub-region. For example, sub-region 110A includes the text "Dancing," to indicate that the associated portion of the media asset features characters dancing together. As an alternate example, sub-region 110B includes an image selected from the associated portion of the media asset.

In some embodiments, the media guidance application may receive a user selection of a segment of region 108A or 108B, and present a portion of the media asset in response. For example, a user may use an input device (e.g., via user input interface 910 (FIG. 9)) to select sub-region 110A, and the media guidance application may display the portion of the media asset associated with sub-region 110A in content display area 122 in response.

It will be understood that display screen 100 and transport bars 102A and 102B are intended to be illustrative, and not limiting. For example, in some embodiments display screen 100 may not include message region 124, and transport bars 102A and 102B may not include navigation icons 104A and 104B and play position indicators 112A and 112B.

FIG. 2 shows an illustrative message database, which may be used in accordance with some embodiments of the disclosure. Database 200 may be a message database configured to store message entries, such as message entries 212-216. Each of the message entries 212-216 includes several information fields, each of which may correspond to one of the information fields 202-210. These may include message identifier (ID) field 202, message text field 204, supplemental content field 206, timestamp field 208, one or more associated asset fields 210, and the like. In general, database 200 may be relational, self-referential, or have any suitable type of internal structure.

In general, database 200 may be accessed by a media guidance application, and may be used by a media guidance application to identify messages associated with a given media asset. In some embodiments, database 200 may be stored within the memory of a user device (e.g., within storage 908 (FIG. 9)). In some embodiments, the database 200 may be a remote database (e.g., stored within media content source 1016 or media guidance data source 1018 (FIG. 10)), which may be accessed over the Internet or a communications network (e.g., over the communications network 1014 (FIG. 10)) using an appropriate API.

Message entries 212-216 include a message ID field 202. For example, message entry 212 corresponds to message with ID "1," and message entry 214 corresponds to message with ID "2." In general, the media guidance application may use the message ID to refer to messages in the database 200, and may include a message ID in an appropriate SQL request or API call. For example, the media guidance application may submit an API call to request message text from the database from the entry associated with message ID "1," and receive the text "Jules is Cute!" in response.

Message entries 212-216 include a message text field 204, and a supplemental content field 206. For example, the message text field 204 associated with message entry 214 is "Look at this Crazy Guy!," and the associated supplemental content is the image file "Tophatman.jpg." In general, the message text field 204 may contain a string of text associated with the message represented by the message entry, and the supplemental content field 206 may contain any other type of content associated with the message, such as image files, video files, audio files, uniform resource locators (URLs), hyperlinks, embedded files, and the like.

Message entries 212-216 include an optional timestamp field 208, indicating a time that the associated message was created. In some embodiments, the media guidance application may only analyze messages created within a certain time range when identifying frequently referenced entities. For example, the media guidance application may only request messages associated with a particular media asset that were created within the last two hours, or another time-based threshold. In some embodiments, the media guidance application may periodically retrieve new message entries from the database 200, and update navigation options (e.g., transport bars 102A and 102B (FIG. 1)) in response. For example, the media guidance application may check for new messages every minute, and update the transport bars 102A and 102B to be associated with frequently referenced entities in only the most recent messages.

Message entries 212-216 may have any number of associated asset fields 210. Each of the entries in associated asset fields 210 may represent a media asset associated with the message represented by a respective message entry. For example, the associated asset field 210 included in message entry 216 indicates that the message represented by message entry 216 is associated with the film "The Dark Knight."

In some embodiments, the associated asset fields 210 may be automatically populated by a media guidance application. For example, one or more instances of the media guidance application may receive messages while a user is viewing a particular media asset. In this case, the media guidance application may include a new message entry in database 200 representing the user message, and include the particular media asset currently being viewed by the user in the associated asset field 210. As an alternate example, the media guidance application may automatically analyze strings of text associated with a given message, and compare the strings of text against a database of descriptors for known media assets. For example, if the text in the message mentions the name of a character in the film "The Dark Knight," or if the message includes an image of a character portrayed in the film "The Dark Knight," the media guidance application may determine that the message is associated with the film "The Dark Knight." In this case, the media guidance application may store information in the associated asset field 210 indicating that the message is associated with the film "The Dark Knight."

It will be understood that the information fields 202-210 in database 200 are intended to be illustrative, and not limiting. In some embodiments, the database 200 may include message entries with any number of information fields, and the information fields may generally contain any type of data other than the ones described by information fields 202-210. For example, in some embodiments, the message entries may contain information fields indicating one or more entities associated with the messages. In some embodiments, there may be information fields representing a geographical location of a user that created a message, information fields representing a messaging service that was used to create the message, or information fields representing demographic information of a user that created a message. In some embodiments, the media guidance application may use one or more information fields to filter messages to be analyzed to create custom media presentations. For example, the media guidance application may generate navigation options (e.g., transport bars 102A and 102B (FIG. 1)) for a user based on entities frequently referenced in messages created by other users with a similar demographic profile to the user, a similar geographic location as the user, or using a similar messaging service as the user. For example, if the user is an affluent female aged 25-30, the media guidance application may request message entries for messages created by other affluent females aged 25-30, identify entities frequently referenced in the messages, and generate transport bars associated with the identified entities. Additionally, some or all of the database 200 may be combined with some or all of database 300 (FIG. 3) or database 400 (FIG. 4), and the general techniques and types of information fields used in connection with database 200 may be applied to any other database, including database 300 (FIG. 3) and database 400 (FIG. 4).

FIG. 3 shows an illustrative entity database, which may be used in accordance with some embodiments of the disclosure. Database 300 may be an entity database configured to store entity entries, such as entity entries 310-318. Each of the entity entries 310-318 includes several information fields, each of which may correspond to one of the information fields 302-308. These may include entity identifier (ID) field 302, entity name field 304, one or more entity descriptor fields 306, associated asset fields 308, and the like. In general, database 300 may be relational, self-referential, or have any suitable type of internal structure.

In general, database 300 may be accessed by a media guidance application, and may be used by a media guidance application to identify entities referenced by one or more messages. In some embodiments, database 300 may be stored within the memory of a user device (e.g., within storage 908 (FIG. 9)). In some embodiments, the database 300 may be a remote database (e.g., stored within media content source 1016 or media guidance data source 1018 (FIG. 10)), which may be accessed over the Internet or a communications network (e.g., over the communications network 1014 (FIG. 10)) using an appropriate API.

Entity entries 310-318 include an entity ID field 302. For example, entity entry 310 corresponds to entity with ID "1," and entity entry 312 corresponds to entity with ID "2." In general, the media guidance application may use the entity ID to refer to entities in the database 300, and may include an entity ID in an appropriate SQL request or API call. For example, the media guidance application may submit an API call to request a list of entities in database 300 that match the entity descriptor "Jules," and receive the entity ID "2" in response. In turn, the media guidance application may request a list of associated assets from the database 300 from the entry associated with entity ID "2," and receive the list including the media assets "Romeo and Juliet in Paris" and "Romeo and Juliet in London" in response.

Entity entries 310-318 include an entity name field 304. For example, the entity name field 304 associated with entity entry 312 is "Juliet." In general, an entity name or entity ID may be used to search other databases (e.g., database 400 (FIG. 4)) for entries associated with a given entity, or entries that include information fields that match the name or entity ID of a given entity.

Entity entries 310-318 include one or more entity descriptor fields 306. The entity descriptor fields 306 may correspond to the name of an entity, a location of an entity, a notable feature of the entity, an actor portraying the entity, or any other suitable type of descriptor. For example, the entity descriptor fields associated with entity entry 312 are "Juliet," "Jules," and "Capulet," and the entity descriptor fields associated with the entity entry 318 are "Joker," "Prince of Crime," and "Heath Ledger." In general, the entity descriptor fields may be used to determine if a given message references a particular entity represented by one of the entity entries 310-318 in the database 300. For example, if a string of text of a given message (e.g., retrieved by the media guidance application from message text field 204 of a message entry 212-216 in database 200 (FIG. 2)) is "Jules is Cute!," the media guidance application may compare the string of text "Jules is Cute!" against the entity descriptor fields 306 in database 300 to identify entity entries 310-318 with entity descriptor fields 306 that match at least a portion of the string of text "Jules is Cute!" In this case, the media guidance application may determine that entity entry 312 representing the entity "Juliet" includes an entity descriptor information field "Jules" that matches a portion of the string of text "Jules is Cute!" Accordingly, the media guidance application may determine that the message was associated with the entity "Juliet" represented by entity entry 312.

Entity entries 310-318 include one or more associated asset fields 308. Each of the entries in associated asset fields 308 may represent a media asset associated with a given entity entry 310-318 in the database 300. For example, if a given entity entry 310-318 is a character depicted with several media assets, the media assets may be included in associated asset fields 308 for the given entity entry 310-318. Similarly, if a given entity entry 310-318 is a particular actor, director, object, or location, any media assets featuring that actor, director, object, or location may be included in the associated asset fields 308 for the given entity entry 310-318. For example, the entity entry 316 associated with the object "Eiffel Tower" may include films featuring the object "Eiffel Tower" in the associated asset field 308, such as the film "Romeo and Juliet in Paris," the film "The Man on the Eiffel Tower," and the film "Midnight in Paris."

It is understood that the information fields 302-308 are intended to be illustrative, and not limiting. In some embodiments, the database 300 may include entity entries with any number of information fields, and the information fields may generally contain any type of data other than the ones described by the information fields 302-308. For example, database 300 may include additional information fields containing metadata about the entities associated with the various entity entries 310-318, such as actors depicting entities, dialogue spoken by or about an entity, different plot lines involving an entity, popular or iconic imagery associated with the entity, or the like. Additionally, some or all of the database 300 may be combined with some or all of database 200 (FIG. 2) or database 400 (FIG. 4), and the general techniques and types of information fields used in connection with database 300 may be applied to any other database, including database 200 (FIG. 2) and database 400 (FIG. 4). For example, a media guidance application may use message text identified from message entries in database 200 in order to identify entity entries in database 300 representing entities associated with the message entry. As another example, information from databases 200, 300, and 400 may be combined into a knowledge graph representing relationships between entities, and a media guidance application may use this knowledge graph to identify entities indirectly referenced by messages (e.g., messages represented by message entries 212-216 in database 200 (FIG. 2)). For instance, a media guidance application may use the connections between entities to determine that a message referencing "that guy who was also in that scene with the Eiffel Tower" is associated with the entity "Tophat Man," on the basis that the entity "Tophat Man" is featured in the same scene as the entity "Eiffel Tower" in the "Eiffel Tower Scene" portion of the film "Romeo and Juliet in Paris."

FIG. 4 shows an illustrative media asset portion database, which may be used in accordance with some embodiments of the disclosure. Database 400 may be a media asset portion database configured to store asset portion entries, such as asset portion entries 414-418. Each of the asset portion entries 414-418 includes several information fields, each of which may correspond to one of the information fields 402-412. These may include portion identifier (ID) field 402, portion descriptor field 404, start time field 406, end time field 408, one or more featured entity fields 410, an associated asset field 412, and the like. In general, database 400 may be relational, self-referential, or have any suitable type of internal structure.

In general, database 400 may be accessed by a media guidance application, and may be used by a media guidance application to identify entities referenced by one or more messages. In some embodiments, database 400 may be stored within the memory of a user device (e.g., within storage 908 (FIG. 9)). In some embodiments, the database 400 may be a remote database (e.g., stored within media content source 1016 or media guidance data source 1018 (FIG. 10)), which may be accessed over the Internet or a communications network (e.g., over the communications network 1014 (FIG. 10)) using an appropriate API.

Asset portion entries 414-418 include portion ID field 402. For example, asset portion entry 414 corresponds to asset portion with ID "1," and asset portion entry 416 corresponds to asset portion with ID "2." In general, the media guidance application may use the asset portion ID to refer to entities in the database 400, and may include an asset portion ID in an appropriate SQL request or API call. For example, the media guidance application may submit an API call to request a list of asset portion entries in database 400 that include the featured entity "Juliet," and receive the portion asset identifiers "1" and "2" in response. As an alternate example, if the media guidance application wishes to generate a display of an asset portion, the media guidance application may request video and audio files from a content source (e.g., from a media content source 1016) for asset portions associated with a given asset portion identifier. For instance, the media guidance application may retrieve the video and audio files of the "Eiffel Tower Scene" of the film "Romeo and Juliet in Paris" by requesting files from a content source associated with the asset portion identifier "1."

Asset portion entries 414-418 include portion descriptor field 404. For example, the portion descriptor field 404 associated with the asset portion entry 414 is "Eiffel Tower Scene." In some embodiments, a portion descriptor may be used by the media guidance application to identify messages associated with a given asset portion. For example, the media guidance application may determine that a message is associated with a given asset portion when a portion of a string of text associated with the message matches a portion of a portion descriptor stored in a portion descriptor field 404 of an asset portion entry associated with a given asset portion. In some embodiments, a portion descriptor (e.g., text contained in portion descriptor field 404) may be used in generating graphics when presenting navigation options to a user. For example, the media guidance application may generate a display of a region of a transport bar (e.g., sub-region 110A of transport bar 102A (FIG. 1)) associated with a given asset portion, that includes a portion of the text from a portion descriptor associated with the given asset portion. This may allow a user viewing the transport bar to easily identify the different sub-regions and the associated portions of the media asset.

Asset portion entries 414-418 include start time field 406 and end time field 408. The start time field 406 and end time field 408 may indicate the relative start time and end time of an asset portion within an asset. For example, asset portion entry 414 has a start time field 406 of "00:35:00," and an end time field 408 of "00:38:00." This may indicate that the asset portion represented by asset portion entry 414, "Eiffel Tower Scene," occurs in the asset, the film "Romeo and Juliet and Paris," starting at the time "00:35:00" and ending at time "00:38:00." In general, the media guidance application may use the contents of the start time field 406 and the end time field 408 to request particular portions of an asset from a media content source (e.g., media content source 1016). For example, to retrieve the audio and video files associated with asset portion entry 414, the media guidance application may request the media content source for the audio and video between "00:35:00" and "00:38:00" from the film "Romeo and Juliet and Paris."

Asset portion entries 414-418 include one or more featured entity fields 410. For example, featured entity fields 410 from asset portion entry 414 include the entities "Romeo," "Juliet," "Tophat Man," and "Eiffel Tower." In general, the media guidance application may use database 400 to identify asset portion entries 414-418 that include a particular entity in featured entity fields 410. For example, the media guidance application may request entries from database 400 that include the entity "Tophat Man" in the featured entity fields 410, and receive identifying information (e.g., an asset portion ID number) for asset portion entry 414 and asset portion entry 418 in response. In some embodiments, the media guidance application may generate a custom presentation from asset portions identified in database 400. For example, after receiving a list of asset portions featuring the entity "Tophat Man," the media guidance application may arrange those asset portions in a particular order in order to generate a custom presentation of an asset including asset portions featuring the entity "Tophat Man." In some embodiments, the media guidance application may identify asset portions from database 400 that exclude certain entities, or include certain combinations of entities. For example, the media guidance application may request asset portions featuring the entity "Tophat Man" and the entity "Romeo," but not featuring the entity "Juliet."

Asset portion entries 414-418 include associated asset field 412. For example, asset portion entry 414 includes an associated asset field 412 indicating that the asset portion is associated with the film "Romeo and Juliet in Paris." In general, the media guidance application use the information contained in the associated asset fields 412 to either only identify asset portions associated with a particular film, or in order to uniquely identify audio and video files of an asset to be retrieved from a media content source (e.g., media content source 1016). For example, the media guidance application may be able to request a given asset portion from a media content source by providing a request including the start time, end time, and identifying information for the associated asset.

It is understood that the information fields 402-412 are intended to be illustrative, and not limiting. In some embodiments, the database 400 may include asset portion entries with any number of information fields, and the information fields may generally contain any type of data other than the ones described by the information fields 402-412. For example, database 400 may include additional information fields containing metadata about the asset portions associated with the various asset portion entries 414-418, such as locations where the portion of the media asset was filmed, the setting depicted within the portion of the media asset, dialogue occurring within the portion of the media asset, different plot lines depicted within the portion of the media asset, popular or iconic imagery depicted within the portion of the media asset, or the like. In some embodiments, database 400 may also include metadata related to the availability of the various media assets, or portions of the media assets, from one or more content providers. For example, a given media asset may be available from a cable company or local DVR, while another media asset may only be available from an OTT content provider such as NETFLIX or HULU.

Additionally, it is understood that some or all of the database 400 may be combined with some or all of database 200 (FIG. 2) or database 300 (FIG. 3), and the general techniques and types of information fields used in connection with database 400 may be applied to any other database, including database 200 (FIG. 2) and database 300 (FIG. 3). For example, a media guidance application may use message text identified from message entries in database 200 in order to identify asset portion entries in database 400 representing asset portions associated with the message entry by comparing the text with the entries in database 400. In this case, the media guidance application may then determine that the one or more entities listed in featured entity fields 410 of the identified asset portion entries are associated with the message. For instance, if the media guidance application identifies a string of text "Look at them dancing!" from a message, the media guidance application may determine that the string of text partially matches the descriptor "Dancing Scene" of asset portion entry 416. The media guidance application may then determine that the message is associated with the entities "Romeo" and "Juliet" listed in the featured entity fields 410 of asset portion entry 416. It is also understood that the media guidance application may use any of the data contained in information fields 402-412 to identify asset portions to be included or excluded from a custom presentation.

FIG. 5 shows an illustrative custom presentation, which may be used in accordance with some embodiments of the disclosure. In general, custom presentation 500 may be formed from portions of media assets arranged in a particular order. In some embodiments, custom presentation 500 may be automatically created by a media guidance application. In some embodiments, custom presentation may be created by a user, an organization, a content creator, or be created algorithmically by a program or application other than a media guidance application.

In general, custom presentation 500 may be stored within the memory of a user device (e.g., within storage 908 (FIG. 9)). In some embodiments, the custom presentation 500 may be stored as part of a general database, or as part of a media asset playlist database. A media guidance application may use custom presentation 500 to generate for display custom navigation options (e.g., transport bar 102A or 102B (FIG. 1)) that a user may interact with. For example, the media guidance application may generate for display a transport bar with a region (e.g., transport bar 102A or 102B with region 108A or 108B) representing a particular custom presentation, and with sub-regions (e.g., sub-region 110A or 110B) representing particular asset portions within the custom presentation.

Custom presentation 500 includes a presentation name information field 502, indicating that the name of the custom presentation 500 is "Romeo and Juliet's Romance." In general, a media guidance application may use the name of a custom presentation to look up a particular custom presentation within a database. In some embodiments, the media guidance application may generate a display that includes the name of the custom presentation as part of a set of custom navigation options (e.g., as text included in indicators 106A and 106B of transport bars 102A and 102B (FIG. 1)). For example, if a transport bar includes a region associated with the portions of the media asset within custom presentation 500, an indicator displayed as part of the transport bar may include the text from the presentation name information field 502 of custom presentation 500, "Romeo and Juliet's Romance."

Custom presentation 500 includes one or more asset source information fields 504, indicating that the custom presentation 500 includes media asset portions from the film "Romeo and Juliet in Paris." In general, the asset source information fields of a custom presentation indicate the assets that a media guidance application will need to retrieve asset portions from in order to present the custom presentation to a user. In some embodiments, the media guidance application may only generate a display of custom navigation options (e.g., transport bars 102A and 102B (FIG. 1)) for a custom presentation if a user is authorized to access all of the asset sources for a given custom presentation. For example, if a particular custom presentation includes asset portions from the first three seasons of the television show "Game of Thrones," but the user only has access to the first season of the television show "Game of Thrones," the media guidance application may prevent navigation options for that particular custom presentation from being displayed to a user.

Custom presentation 500 includes a display sub-portion flag 506. In general, the display sub-portion flag 506 may be a Boolean value indicating whether or not the media guidance application will generate a display that visually distinguishes between different media asset portions when presenting a display of custom navigation options (e.g., transport bars 102A and 102B (FIG. 1)) for a custom presentation. For example, because the display sub-portion flag 506 for custom presentation 500 is "True," if the media guidance application generates a display of a transport bar (e.g., transport bar 102A (FIG. 1)) for the custom presentation 500, the region associated with the portions of the media asset that form the custom presentation (e.g., region 108A) will be divided into sub-regions (e.g., sub-region 110A) that are visually distinguished from one another to indicate the portions of the region that are associated with each specific portion of the media asset within custom presentation 500.

Custom presentation 500 includes a sub-portion descriptor flag 508. The sub-portion descriptor flag may indicate what type of descriptors, if any, the media guidance application should include to delineate between different portions of the media asset within custom presentation 500 when generating a display of custom navigation options (e.g., transport bars 102A and 102B (FIG. 1)) for a custom presentation. For example, if the sub-portion descriptor flag 508 is "Text," the media guidance application may use text (e.g., text taken from portion description fields 520 of asset portion entries 522-526) to differentiate between the different portions of the media asset when presenting a display of custom navigation options (e.g., the text "Dancing" overlaid on sub-region 110A of transport bar 102A (FIG. 1)) for a custom presentation. As an alternate example, if the sub-portion descriptor flag 508 is "Image," the media guidance application may differentiate between the different portions of the media asset by using images (e.g., the image overlaid on sub-region 110B of transport bar 102B (FIG. 1)) taken from the respective portion of the media asset. As an alternate example, the sub-portion descriptor flag 508 may be "Both" or "None," indicating that the media guidance application should use both text and images, or neither text nor images to delineate between media asset portions.

Custom presentation 500 includes one or more associated entity information fields 510. These associated entity information fields may indicate one or more entities associated with a given custom presentation. For example, the associated entity information fields 510 for custom presentation 500 indicate that custom presentation 500 is associated with the entities "Romeo" and "Juliet." In general, a media guidance application may use the associated entities of a custom presentation to search for a custom presentation within a database. For example, the media guidance application may determine that a particular entity, "Romeo," is frequently mentioned in messages related to a particular media asset, and will search for custom presentations that include "Romeo" in the associated entity information fields. In some embodiments, the media guidance application may generate a display that includes identifying information for one or more entities associated with a custom presentation (e.g., as text or images included in indicators 106A and 106B of transport bars 102A and 102B (FIG. 1)) when generating a display of custom navigation options for the custom presentation.

Custom presentation 500 includes a presentation playlist 512. Generally, the presentation playlist 512 may represent an ordered arrangement of media asset portions (e.g., described by asset portion entries 522-526) that form the custom presentation 500. Asset portion entries 522-526 may define the presentation playlist 512, and each of asset portion entries 522-526 may include several information fields, each of which may correspond to one of the information fields 514-520. These may include presentation order information fields 514, source media asset information fields 516, portion identifier (ID) fields 518, and portion description fields 520.

Asset portion entries 522-526 include a presentation order information field 514. For example, the presentation order information field 514, "1," for asset portion entry 522 indicates that the asset portion represented by asset portion entry 522 appears first in custom presentation 500. Similarly, the presentation order information field 514, "2," for asset portion entry 524 indicates that the asset portion represented by asset portion entry 524 appears second in custom presentation 500. In general, the order of the asset portions with a custom presentation may be determined by a media guidance application when the custom presentation is first created. For example, the media guidance application may generate a custom presentation for a particular entity by identifying media asset portions associated with the entity, and arranging those media asset portions in an order. The media guidance application may then store the custom presentation in memory by storing a presentation playlist 512 for the custom presentation with presentation order information fields 514 to indicate the arranged order of media asset portions. This may allow another instance, or the same instance, of the media guidance application to easily recreate a previously saved custom presentation by retrieving the presentation playlist 512 from memory.

Asset portion entries 522-526 include a source media asset information field 516. The source media asset information field 516 may be used to identify the media asset that a particular asset portion comes from. For example, the source media asset information field 516 for asset portion entry 522 indicates that the asset portion represented by asset portion entry 522 comes from the film "Romeo and Juliet in Paris." In general, the information contained in the source media asset information field 516 may correspond to the information contained in an asset portion database (e.g., associated asset fields 412 of database 400 (FIG. 4)), and may allow the media guidance application to look up the asset portion in a database (e.g., database 400) in conjunction with either a portion ID, or a portion descriptor.

Asset portion entries 522-526 include a portion ID field 518. For example, asset portion entry 522 corresponds to asset portion with ID "1," and asset portion entry 526 corresponds to asset portion with ID "8." In general, the media guidance application may use the asset portion ID to refer to entities in a media asset portion database (e.g., database 400 (FIG. 4)), and may uniquely identify the media asset portion.

Asset portion entries 522-526 include a portion descriptor field 520. For example, the portion descriptor field 520 for the asset portion entry 522 is "Eiffel Tower Scene." In some embodiments, the portion descriptor field 520 may be the same as a given portion descriptor field 404 (FIG. 4) for an asset. In some embodiments, a portion descriptor (e.g., text contained in portion descriptor field 520) may be used by a media guidance application when generating a display of custom navigation options (e.g., transport bars 102A and 102B (FIG. 1)) for a custom presentation.

It is understood that asset portion entries 522-526 are intended to be illustrative, and not limiting. In some embodiments, asset portion entries 522-526 may include any suitable number of information fields, such as any of the information fields discussed in relation to database 400 (FIG. 4). For example, each of the asset portion entries 522-526 may correspond to a portion of a different media asset (e.g., each portion comes from a different episode of a television series), and there may be an information field indicating the availability of that particular portion of the media asset from one or more content providers (e.g., from a given media content source 1016 (FIG. 10)). For instance, a first asset portion may correspond to a media asset available from a local DVR (e.g., a recently recorded episode of a television series), and a second asset portion may correspond to a media asset available from an OTT content provider (e.g., an episode of the television series from a previous season). In general, this information may be stored within asset portion entries 522-526, and a media guidance application may use this information to retrieve each portion of the media asset from the corresponding content source when the corresponding portion of the media asset is to be presented (e.g., by being displayed in content display area 122 (FIG. 1)). For example, a media guidance application may display navigation options for custom presentation 500 (e.g., a version of transport bar 102A with a region 108A (FIG. 1) representing the media asset portions within presentation playlist 512). When the media guidance application receives a user selection of a segment of region 108A corresponding to a particular portion of the media asset (e.g., a user selection of sub-region 110A corresponding to a given portion of the media asset (FIG. 1)), the media guidance application may determine the availability of that media asset portion from different content providers using the information fields contained within the corresponding asset portion entry (e.g., one of asset portion entries 522-526). The media guidance application may then retrieve that media asset portion from the content provider indicated in the corresponding asset portion entry, and present that media asset portion to the user (e.g., by generating a display of the media asset portion in content display region 122 of display screen 100 (FIG. 1)). This may allow multiple instances of the media guidance application to share custom presentations (e.g., custom presentation 500) with one another easily. Rather than exchange video and audio files directly, a media guidance application using the information from custom presentation 500 may retrieve the appropriate audio and video files for each media asset portion directly from content providers (e.g., media content source 1016 (FIG. 10)) as needed.

It is understood that custom presentation 500 is intended to be illustrative, and not limiting. For example, in some embodiments the custom presentation 500 may only include a playlist of media asset portions (e.g., presentation playlist 512), and presentation name information field 502, asset source information fields 504, display sub-portion flag 506, sub-portion descriptor flag 508, and associated entity information fields 510 may be optionally included or not included. In general, the custom presentation 500 may include any number of other information fields and flags, and the information fields and flags may contain any type of data or indicators other than the ones described in connection with presentation name information field 502, asset source information fields 504, display sub-portion flag 506, sub-portion descriptor flag 508, and associated entity information fields 510. Additionally, the custom presentation 500 may incorporate some or all of the elements from database 400 (FIG. 4), database 300 (FIG. 3), or database 200 (FIG. 2). For example, the presentation playlist 512 may include asset portion entries 522-526 that include a list of featured entities (e.g., similar to featured entity fields 410 of database 400 (FIG. 4)).

Figure 6:
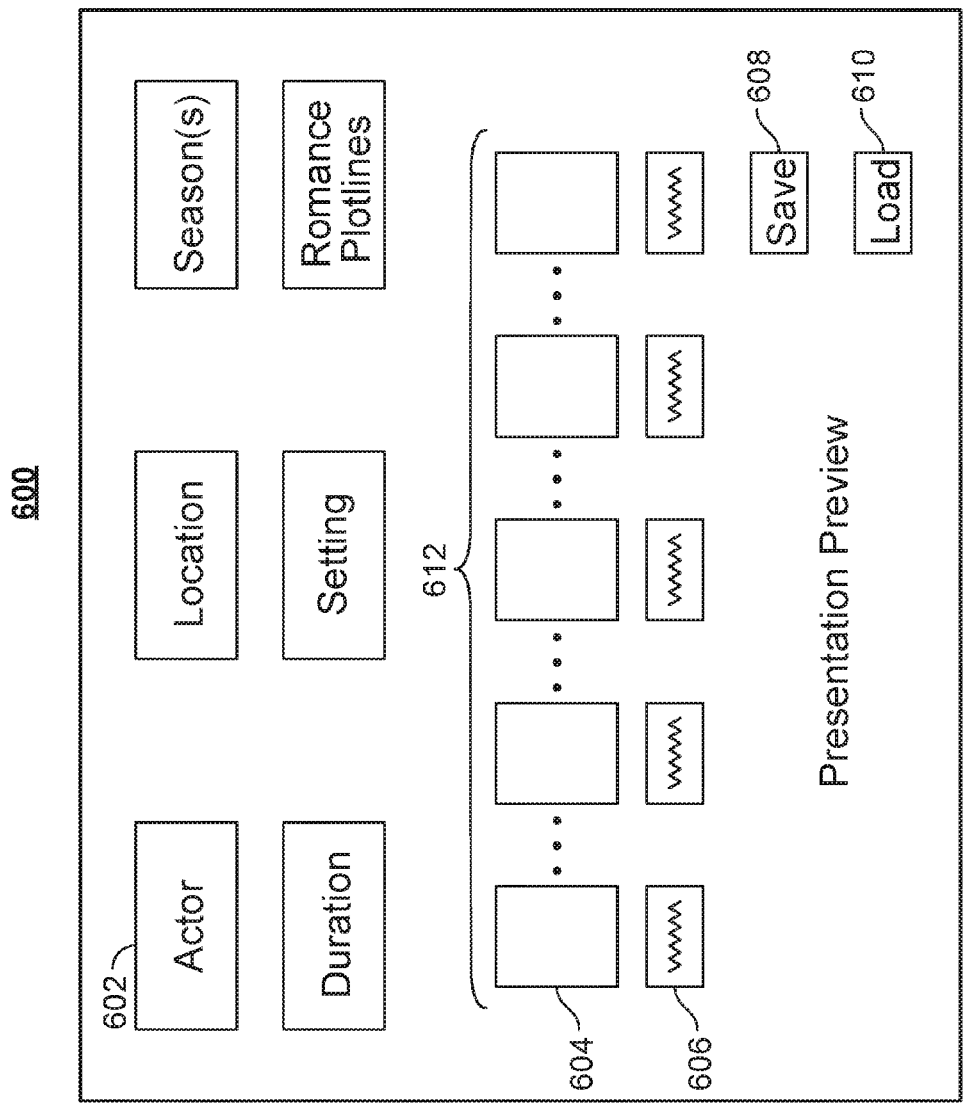
FIG. 6 shows an illustrative example of an interface for creating custom presentations, which may be used in accordance with some embodiments of the disclosure.

FIG. 6 shows an illustrative example of an interface for creating custom presentations, which may be used in accordance with some embodiments of the disclosure. Custom presentation creation screen 600 may be generated for display by a media guidance application, or by another application or device running in tandem with the media guidance application. Custom presentation creation screen 600 may be displayed, for instance, on a monitor or television display connected to a set-top box running the media guidance application (e.g., display 912 (FIG. 9)). Filters 602 may be selected by the user in order to select portions of a media asset to be included in a custom presentation. For example, a user may be able to use filters 602 to identify portions of the media asset featuring particular actors, characters, or plotlines. Based on the filters 602 selected by the user, the media guidance application may identify a number of portions of the media asset (e.g., from an asset portion database such as database 400 (FIG. 4)) that satisfy the filters 602. For example, if the user indicated that he or she wants to be presented with only media asset portions featuring a particular entity, the media guidance application may search the portion asset database to identify media asset portions featuring that particular entity. The media guidance application may then display the identified portions to the user as custom presentation layout 612.

In some embodiments, the filters 602 may be generated based on popular entities or topics discussed in messages associated with the media asset. For example, if the media asset was the film "Romeo and Juliet in Paris," and the media guidance application determines that the characters "Romeo" and "Juliet" were being frequently discussed, the media guidance application may display filters 602 related to the characters "Romeo" and "Juliet." As an alternate example, the media guidance application may determine that messages associated with the media asset frequently mention a particular romantic plotline depicted in the media asset, and the media guidance application may update one of the filters 602 to allow users to filter for portions of the media asset that are related to that particular plotline.

Custom presentation layout 612 displays the custom presentation that the user created. Each of the portions of the media asset that form the custom presentation may be displayed side by side within the custom presentation layout 612. For example, each of the media asset portions may be represented by a thumbnail image 604, and the user may drag, manipulate, or rearrange the thumbnail images 604 in order to change the order of the media asset portions within the custom presentation. The media guidance application may display optional portion metadata 606 in order to provide additional information about the media asset portions represented by the thumbnail image 604. For example, the portion metadata 606 may display a descriptive name of the media asset portion, the duration of the media asset portion, a list of entities or plotlines depicted in the media asset portion, the original media asset that the media asset portion was taken from, or the like. In general, a user may also use conventional video editing techniques and commands to create the custom presentation within the custom presentation creation screen 600, for example, by applying particular special effects or scene transition effects between the portions of the media asset.

In some embodiments, the media guidance application may allow the user to provide audio input (e.g., through a microphone) in order to create a custom presentation, or to refine an existing custom presentation. In general, by using natural language processing, the media guidance application may convert the audio signal into a string of text, and parse out the user command. For example, if the user requested "show me only romantic scenes," the media guidance application may determine that the user wishes to filter the media asset portions and display only romantic scenes in the custom presentation layout 612.

Custom presentation creation screen 600 may include a save button 608, and a load button 610. When the media guidance application receives a user selection of the save button 608, the media guidance application may save a copy of the custom presentation depicted in the custom presentation layout 612 to a storage device (e.g., within storage 908 (FIG. 9)). In some embodiments, the media guidance application may save the custom presentation as a video file. In some embodiments, the media guidance application may save the custom presentation as a presentation playlist (e.g., presentation playlist 512). When the media guidance application receives a user selection of the load button 610, the media guidance application may provide the user with the opportunity to indicate a custom presentation to be retrieved from a storage device (e.g., from within storage 908 (FIG. 9)). The media guidance application may then retrieve the custom presentation from the storage device, and display the custom presentation within the custom presentation layout 612 portion of the custom presentation creation screen 600.

It is understood that custom presentation creation screen 600 is intended to be illustrative, and not limiting. For example, in some embodiments custom presentation creation screen 600 may include areas for the user to modify various information fields and flags, similar to the presentation name information field 502, display sub-portion flag 506, and sub-portion descriptor flag 508 discussed in relation to custom presentation 500 (FIG. 5).

Figure 7:
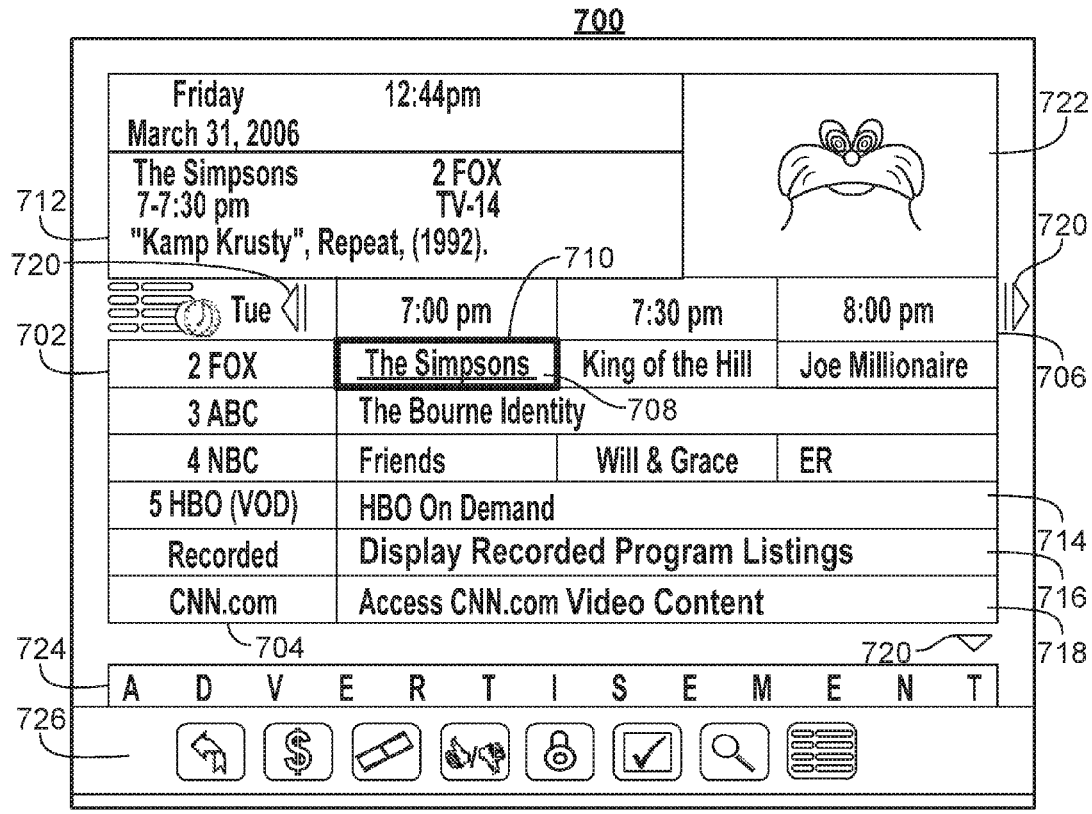
FIG. 7 shows an illustrative example of a display screen for use in accessing media content in accordance with some embodiments of the disclosure.
Figure 8:
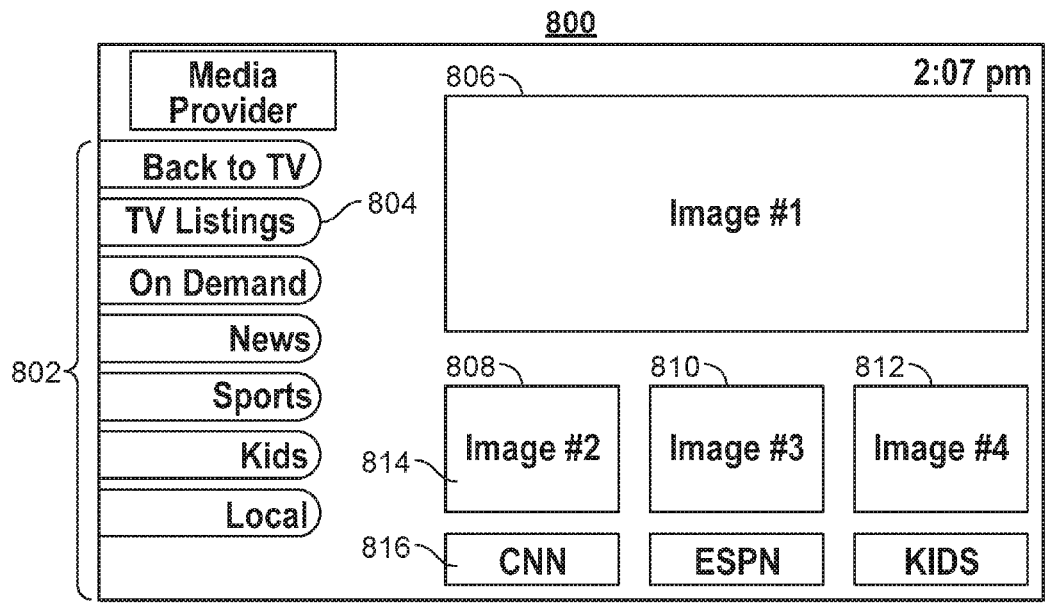
FIG. 8 shows another illustrative example of a display screen used to access media content in accordance with some embodiments of the disclosure.

FIGS. 7-8 show illustrative display screens that may be used to provide media guidance data. The display screens shown in FIGS. 7-8 may be implemented on any suitable user equipment device or platform. While the displays of FIGS. 7-8 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 7 shows illustrative grid of a program listings display 700 arranged by time and channel that also enables access to different types of content in a single display. Display 700 may include grid 702 with: (1) a column of channel/content type identifiers 704, where each channel/content type identifier (which is a cell in the column) identifies a different channel or content type available; and (2) a row of time identifiers 706, where each time identifier (which is a cell in the row) identifies a time block of programming. Grid 702 also includes cells of program listings, such as program listing 708, where each listing provides the title of the program provided on the listing's associated channel and time. With a user input device, a user can select program listings by moving highlight region 710. Information relating to the program listing selected by highlight region 710 may be provided in program information region 712. Region 712 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 702 may provide media guidance data for non-linear programming including on-demand listing 714, recorded content listing 716, and Internet content listing 718. A display combining media guidance data for content from different types of content sources is sometimes referred to as a "mixed-media" display. Various permutations of the types of media guidance data that may be displayed that are different than display 700 may be based on user selection or guidance application definition (e.g., a display of only recorded and broadcast listings, only on-demand and broadcast listings, etc.). As illustrated, listings 714, 716, and 718 are shown as spanning the entire time block displayed in grid 702 to indicate that selection of these listings may provide access to a display dedicated to on-demand listings, recorded listings, or Internet listings, respectively. In some embodiments, listings for these content types may be included directly in grid 702. Additional media guidance data may be displayed in response to the user selecting one of the navigational icons 720. (Pressing an arrow key on a user input device may affect the display in a similar manner as selecting navigational icons 720.)

Display 700 may also include video region 722, advertisement 724, and options region 726. Video region 722 may allow the user to view and/or preview programs that are currently available, will be available, or were available to the user. The content of video region 722 may correspond to, or be independent from, one of the listings displayed in grid 702. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 724 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 702. Advertisement 724 may also be for products or services related or unrelated to the content displayed in grid 702. Advertisement 724 may be selectable and provide further information about content, provide information about a product or a service, enable purchasing of content, a product, or a service, provide content relating to the advertisement, etc. Advertisement 724 may be targeted based on a user's profile/preferences, monitored user activity, the type of display provided, or on other suitable targeted advertisement bases.

While advertisement 724 is shown as rectangular or banner shaped, advertisements may be provided in any suitable size, shape, and location in a guidance application display. For example, advertisement 724 may be provided as a rectangular shape that is horizontally adjacent to grid 702. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 726 may allow the user to access different types of content, media guidance application displays, and/or media guidance application features. Options region 726 may be part of display 700 (and other display screens described herein), or may be invoked by a user by selecting an on-screen option or pressing a dedicated or assignable button on a user input device. The selectable options within options region 726 may concern features related to program listings in grid 702 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 10. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 8. Video mosaic display 800 includes selectable options 802 for content information organized based on content type, genre, and/or other organization criteria. In display 800, television listings option 804 is selected, thus providing listings 806, 808, 810, and 812 as broadcast program listings. In display 800 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 808 may include more than one portion, including media portion 814 and text portion 816. Media portion 814 and/or text portion 816 may be selectable to view content in full-screen or to view information related to the content displayed in media portion 814 (e.g., to view listings for the channel that the video is displayed on).

The listings in display 800 are of different sizes (i.e., listing 806 is larger than listings 808, 810, and 812), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 9:
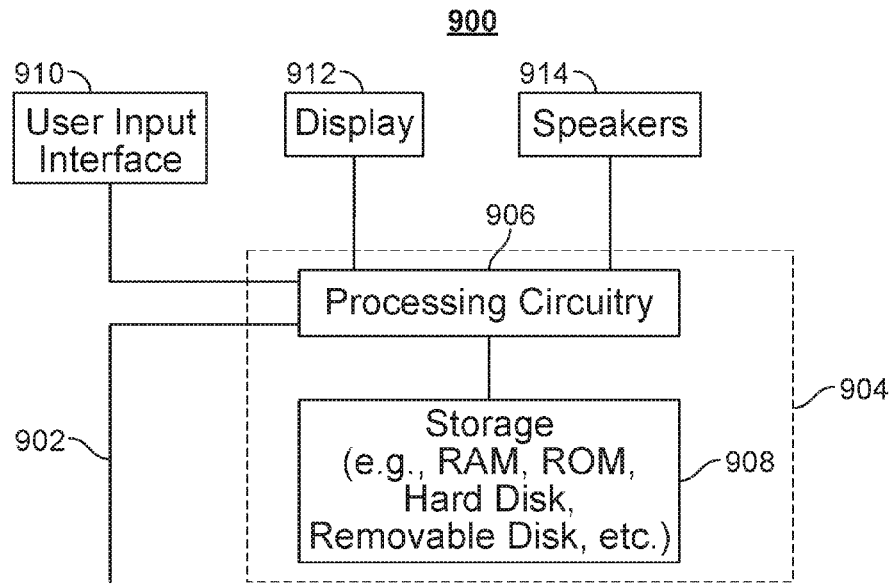
FIG. 9 is a block diagram of an illustrative user equipment device in accordance with some embodiments of the disclosure.

Users may access content and the media guidance application (and its display screens described above and below) from one or more of their user equipment devices. FIG. 9 shows a generalized embodiment of illustrative user equipment device 900. More specific implementations of user equipment devices are discussed below in connection with FIG. 10. User equipment device 900 may receive content and data via input/output (hereinafter "I/O") path 902. I/O path 902 may provide content (e.g., broadcast programming, on-demand programming, Internet content, content available over a local area network (LAN) or wide area network (WAN), and/or other content) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for a media guidance application stored in memory (i.e., storage 908). Specifically, control circuitry 904 may be instructed by the media guidance application to perform the functions discussed above and below. For example, the media guidance application may provide instructions to control circuitry 904 to generate the media guidance displays. In some implementations, any action performed by control circuitry 904 may be based on instructions received from the media guidance application.

In client-server based embodiments, control circuitry 904 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 10, may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of the user equipment 900. Circuitry 904 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

A user may send instructions to control circuitry 904 using user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of user equipment device 900. For example, display 912 may be a touchscreen or touch-sensitive display. In such circumstances, user input interface 910 may be integrated with or combined with display 912. Display 912 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 912 may be HDTV-capable. In some embodiments, display 912 may be a 3D display, and the interactive media guidance application and any suitable content may be displayed in 3D. A video card or graphics card may generate the output to the display 912. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 904. The video card may be integrated with the control circuitry 904. Speakers 914 may be provided as integrated with other elements of user equipment device 900 or may be stand-alone units. The audio component of videos and other content displayed on display 912 may be played through speakers 914. In some embodiments, the audio may be distributed to a receiver (not shown), which processes and outputs the audio via speakers 914.

The guidance application may be implemented using any suitable architecture. For example, it may be a stand-alone application wholly-implemented on user equipment device 900. In such an approach, instructions of the application are stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to generate any of the displays discussed herein. Based on the processed instructions, control circuitry 904 may determine what action to perform when input is received from input interface 910. For example, movement of a cursor on a display up/down may be indicated by the processed instructions when input interface 910 indicates that an up/down button was selected.

In some embodiments, the media guidance application is a client-server based application. Data for use by a thick or thin client implemented on user equipment device 900 is retrieved on-demand by issuing requests to a server remote to the user equipment device 900. In one example of a client-server based guidance application, control circuitry 904 runs a web browser that interprets web pages provided by a remote server. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on equipment device 900. This way, the processing of the instructions is performed remotely by the server while the resulting displays are provided locally on equipment device 900. Equipment device 900 may receive inputs from the user via input interface 910 and transmit those inputs to the remote server for processing and generating the corresponding displays. For example, equipment device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to equipment device 900 for presentation to the user.

In some embodiments, the media guidance application is downloaded and interpreted or otherwise run by an interpreter or virtual machine (run by control circuitry 904). In some embodiments, the guidance application may be encoded in the ETV Binary Interchange Format (EBIF), received by control circuitry 904 as part of a suitable feed, and interpreted by a user agent running on control circuitry 904. For example, the guidance application may be an EBIF application. In some embodiments, the guidance application may be defined by a series of JAVA-based files that are received and run by a local virtual machine or other suitable middleware executed by control circuitry 904. In some of such embodiments (e.g., those employing MPEG-2 or other digital media encoding schemes), the guidance application may be, for example, encoded and transmitted in an MPEG-2 object carousel with the MPEG audio and video packets of a program.

Figure 10:
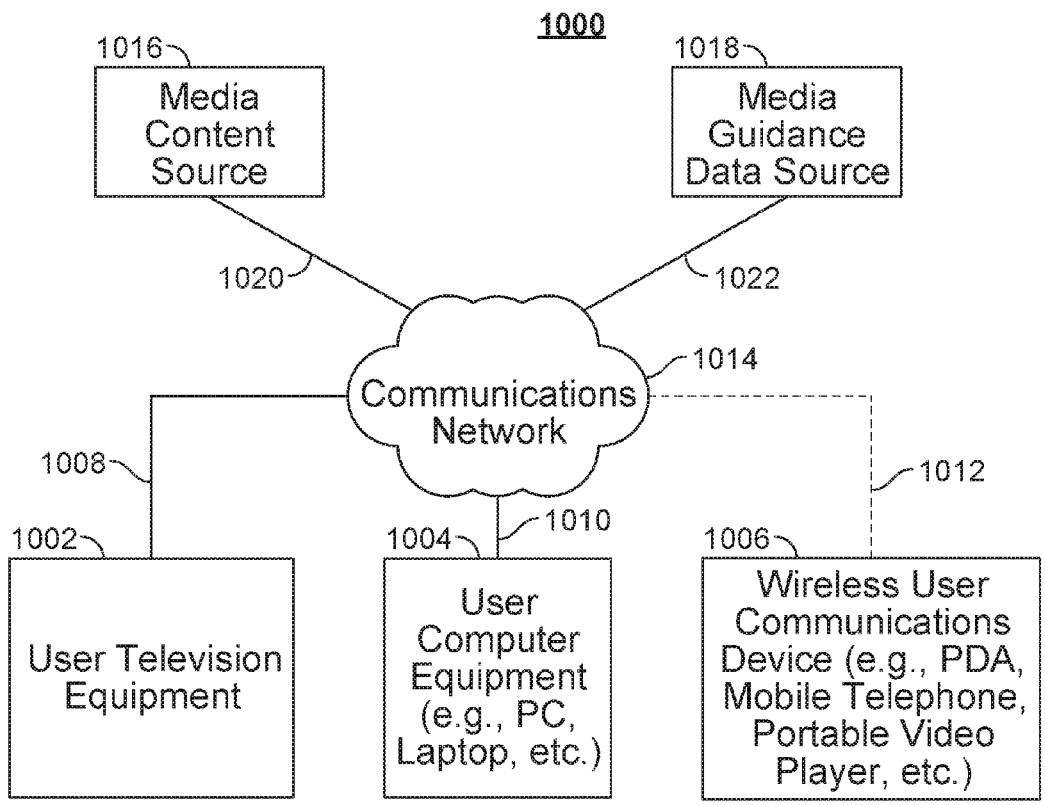
FIG. 10 is a block diagram of an illustrative media system in accordance with some embodiments of the disclosure.

User equipment device 900 of FIG. 9 can be implemented in system 1000 of FIG. 10 as user television equipment 1002, user computer equipment 1004, wireless user communications device 1006, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 9 may not be classified solely as user television equipment 1002, user computer equipment 1004, or a wireless user communications device 1006. For example, user television equipment 1002 may, like some user computer equipment 1004, be Internet-enabled allowing for access to Internet content, while user computer equipment 1004 may, like some user television equipment 1002, include a tuner allowing for access to television programming. The media guidance application may have the same layout on various different types of user equipment or may be tailored to the display capabilities of the user equipment. For example, on user computer equipment 1004, the guidance application may be provided as a web site accessed by a web browser. In another example, the guidance application may be scaled down for wireless user communications devices 1006.

In system 1000, there is typically more than one of each type of user equipment device but only one of each is shown in FIG. 10 to avoid overcomplicating the drawing. In addition, each user may utilize more than one type of user equipment device and also more than one of each type of user equipment device.

In some embodiments, a user equipment device (e.g., user television equipment 1002, user computer equipment 1004, wireless user communications device 1006) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1014. Namely, user television equipment 1002, user computer equipment 1004, and wireless user communications device 1006 are coupled to communications network 1014 via communications paths 1008, 1010, and 1012, respectively. Communications network 1014 may be one or more networks including the Internet, a mobile phone network, mobile voice or data network (e.g., a 4G or LTE network), cable network, public switched telephone network, or other types of communications network or combinations of communications networks. Paths 1008, 1010, and 1012 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1012 is drawn with dotted lines to indicate that in the exemplary embodiment shown in FIG. 10 it is a wireless path and paths 1008 and 1010 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 1008, 1010, and 1012, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1014.

System 1000 includes content source 1016 and media guidance data source 1018 coupled to communications network 1014 via communication paths 1020 and 1022, respectively. Paths 1020 and 1022 may include any of the communication paths described above in connection with paths 1008, 1010, and 1012. Communications with the content source 1016 and media guidance data source 1018 may be exchanged over one or more communications paths, but are shown as a single path in FIG. 10 to avoid overcomplicating the drawing. In addition, there may be more than one of each of content source 1016 and media guidance data source 1018, but only one of each is shown in FIG. 10 to avoid overcomplicating the drawing. (The different types of each of these sources are discussed below.) If desired, content source 1016 and media guidance data source 1018 may be integrated as one source device. Although communications between sources 1016 and 1018 with user equipment devices 1002, 1004, and 1006 are shown as through communications network 1014, in some embodiments, sources 1016 and 1018 may communicate directly with user equipment devices 1002, 1004, and 1006 via communication paths (not shown) such as those described above in connection with paths 1008, 1010, and 1012.

System 1000 may also include an advertisement source 1024 coupled to communications network 1014 via a communications path 1026. Path 1026 may include any of the communication paths described above in connection with paths 1008, 1010, and 1012. Advertisement source 1024 may include advertisement logic to determine which advertisements to transmit to specific users and under which circumstances. For example, a cable operator may have the right to insert advertisements during specific time slots on specific channels. Thus, advertisement source 1024 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 1024 may be configured to maintain user information including advertisement-suitability scores associated with user in order to provide targeted advertising. Additionally or alternatively, a server associated with advertisement source 1024 may be configured to store raw information that may be used to derive advertisement-suitability scores. In some embodiments, advertisement source 1024 may transmit a request to another device for the raw information and calculate the advertisement-suitability scores. Advertisement source 1024 may update advertisement-suitability scores for specific users (e.g., first subset, second subset, or third subset of users) and transmit an advertisement of the target product to appropriate users.

Content source 1016 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1016 may be the originator of content (e.g., a television broadcaster, a Webcast provider, etc.) or may not be the originator of content (e.g., an on-demand content provider, an Internet provider of content of broadcast programs for downloading, etc.). Content source 1016 may include cable sources, satellite providers, on-demand providers, Internet providers, over-the-top content providers, or other providers of content. Content source 1016 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1018 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1018 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1018 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1018 may provide user equipment devices 1002, 1004, and 1006 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 908, and executed by control circuitry 904 of a user equipment device 900. In some embodiments, media guidance applications may be client-server applications where only a client application resides on the user equipment device, and server application resides on a remote server. For example, media guidance applications may be implemented partially as a client application on control circuitry 904 of user equipment device 900 and partially on a remote server as a server application (e.g., media guidance data source 1018) running on control circuitry of the remote server. When executed by control circuitry of the remote server (such as media guidance data source 1018), the media guidance application may instruct the control circuitry to generate the guidance application displays and transmit the generated displays to the user equipment devices. The server application may instruct the control circuitry of the media guidance data source 1018 to transmit data for storage on the user equipment. The client application may instruct control circuitry of the receiving user equipment to generate the guidance application displays.

Content and/or media guidance data delivered to user equipment devices 1002, 1004, and 1006 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1000 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 10.

In one approach, user equipment devices may communicate with each other within a home network. User equipment devices can communicate with each other directly via short-range point-to-point communication schemes described above, via indirect paths through a hub or other similar device provided on a home network, or via communications network 1014. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1016 to access content. Specifically, within a home, users of user television equipment 1002 and user computer equipment 1004 may access the media guidance application to navigate among and locate desirable content. Users may also access the media guidance application outside of the home using wireless user communications devices 1006 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations that provide cloud-based services to various types of users and devices connected via a network such as the Internet via communications network 1014. These cloud resources may include one or more content sources 1016 and one or more media guidance data sources 1018. In addition or in the alternative, the remote computing sites may include other user equipment devices, such as user television equipment 1002, user computer equipment 1004, and wireless user communications device 1006. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1004 or wireless user communications device 1006 having content capture feature. Alternatively, the user can first transfer the content to a user equipment device, such as user computer equipment 1004. The user equipment device storing the content uploads the content to the cloud using a data transmission service on communications network 1014. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 9.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 11:
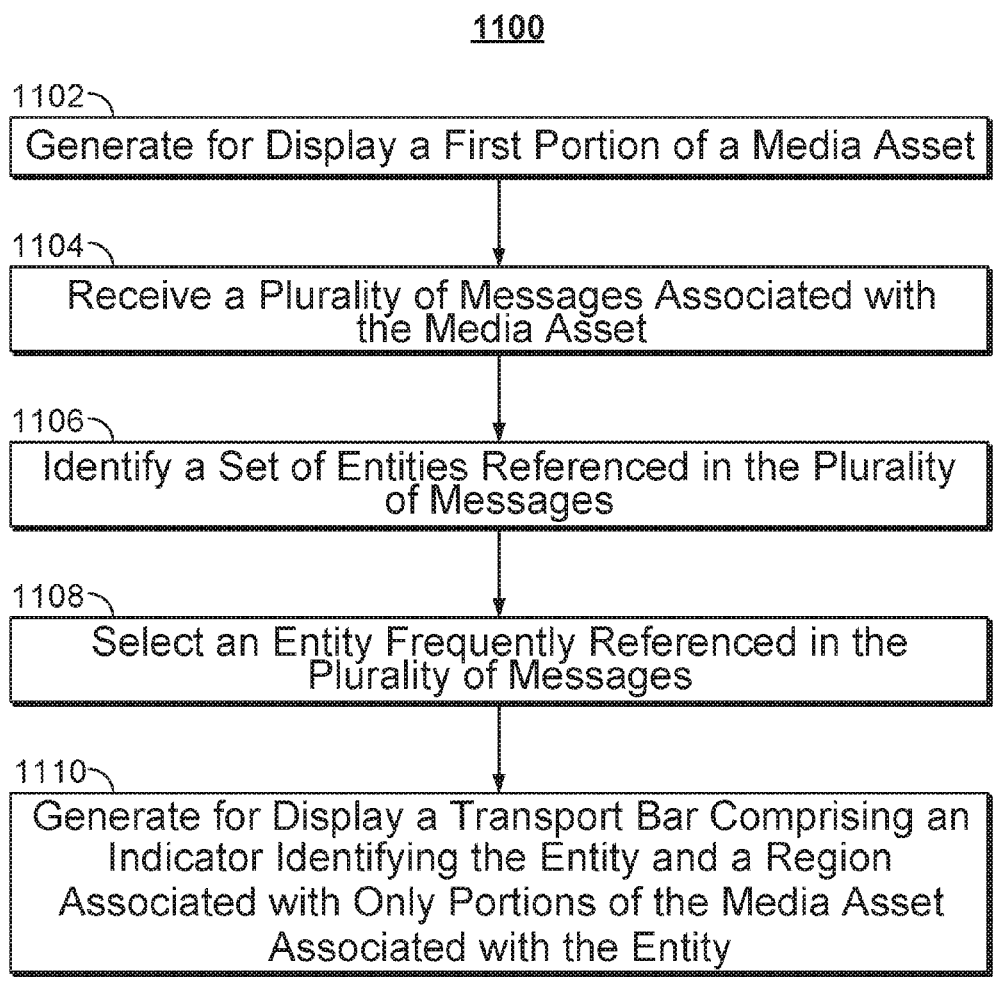
FIG. 11 is a flowchart of illustrative steps for viewing and navigating customized media presentations, in accordance with some embodiments of the disclosure.

FIG. 11 is a flowchart of illustrative steps for viewing and navigating customized media presentations, in accordance with some embodiments of the disclosure. For example, a media guidance application implementing process 1100 may be executed by control circuitry 904 (FIG. 9). It should be noted that process 1100 or any portion thereof could be performed on, or be provided by, any of the devices discussed in relation to FIG. 9 or FIG. 10, and utilize any of the databases or data structures discussed in relation to FIGS. 2-5. It should also be noted that process 1100 or any of the individual procedures discussed in relation to process 1100 may be combined with any of the other processes in this disclosure, including the processes discussed in relation to FIGS. 12-17.

Process 1100 begins at 1102, where the media guidance application generates for display (e.g., via control circuitry 904 (FIG. 9)) a first portion of a media asset. For example, the media guidance application may generate a display of a portion of a television show, film, book, video-game cut scene, or other type of media to be presented to a user (e.g., on display 912 (FIG. 9)). In general, the first portion of the media asset may be displayed by the media guidance application concurrently with any number of other menus, overlays, or other graphics.

Process 1100 continues to 1104, where the media guidance application retrieves (e.g., via control circuitry 904 (FIG. 9)) a plurality of messages associated with the media asset. For example, the media guidance application may retrieve messages from a message database (e.g., database 200 (FIG. 2)) related to the media asset. In some embodiments, the media guidance application may retrieve the messages from a messaging service or social media service, such as Facebook™, Twitter™, or the like. For instance, if the media asset is the film "Romeo and Juliet in Paris," the media guidance application may retrieve messages from a social media service related to the film "Romeo and Juliet in Paris."

Process 1100 continues to 1106, where the media guidance application identifies (e.g., via control circuitry 904 (FIG. 9)) a set of entities referenced in the plurality of messages. For example, the media guidance application may analyze strings of text from the plurality of messages, and determine when the strings of text include a descriptor for one or more entities listed in an entity database (e.g., database 300 (FIG. 3)). For instance, if a message associated with the film "Romeo and Juliet in Paris" included the text "Look at the tower!," the media guidance application may determine that the message is associated with the entity "Eiffel Tower," based on the fact that "Tower" is listed as a descriptor for entity entry 316 associated with the entity "Eiffel Tower" within database 300. In some embodiments, the media guidance application may also attempt to match supplemental content contained in the plurality of messages, such as audio or video files, with one or more known entities. For example, the media guidance application may use image recognition techniques to determine that the video file contain an image of a particular entity. Methods for determining entities referenced in messages are also discussed in relation to FIG. 13.

Process 1100 continues to 1108, where the media guidance application selects (e.g., via control circuitry 904 (FIG. 9)) an entity frequently referenced in the plurality of messages. For example, the media guidance application may select the most frequently referenced entity within the set of entities, or may select one of the three most frequently referenced entities at random. In general, the media guidance application may count the number of times that an entity is referenced in the plurality of messages to determine how frequently a given entity is referenced.

Process 1100 continues to 1110, where the media guidance application generates for display (e.g., via control circuitry 904 (FIG. 9)) a transport bar comprising an indicator identifying the entity and only one or more regions associated with portions of the media asset associated with the entity. For example, if the media guidance application identified the entity "Romeo" from the film "Romeo and Juliet in Paris," the media guidance application may generate a display of a transport bar (e.g., transport bar 102A (FIG. 1)) that indicates the identity of the entity "Romeo" (e.g., indicator 106A (FIG. 1)), and contains a region associated with portions of the media asset associated with the entity (e.g., region 108A (FIG. 1)). In general, the media guidance application may select the portions of the media asset associated with the entity by searching a media asset portion database (e.g., database 400 (FIG. 4)). For example, the media guidance application may search database 400 for portions of the film "Romeo and Juliet in Paris" that feature the entity "Romeo," and identify the portions associated with asset portion entries 414-418. In some embodiments, the media guidance application may assemble portions of the media asset into a custom presentation (e.g., custom presentation 500 (FIG. 5)), and the region is associated with the custom presentation. In this case, the media guidance application may provide the user with an opportunity to select a segment of the region in order to navigate to particular portion of the custom presentation. For instance, the user may be provided with a slider within the region, or a set of navigation buttons, which may allow the user to skip to a particular portion of the custom presentation. Methods of creating custom presentation and selecting media asset portions are also discussed in relation to FIG. 14 and FIG. 15.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, a media guidance application may simultaneously generate for display a transport bar at 1110, while simultaneously receiving additional messages at 1104. This may allow the media guidance application to continue to identify entities frequently referenced in recent messages, and update the transport bar periodically by selecting a new entity at 1108. Furthermore, it should be noted that any of the devices or equipment discussed in relation to FIG. 9 or FIG. 10 or the databases or data structures discussed in relation to FIGS. 2-5 could be used to perform one or more of the steps in FIG. 11.

Figure 12:
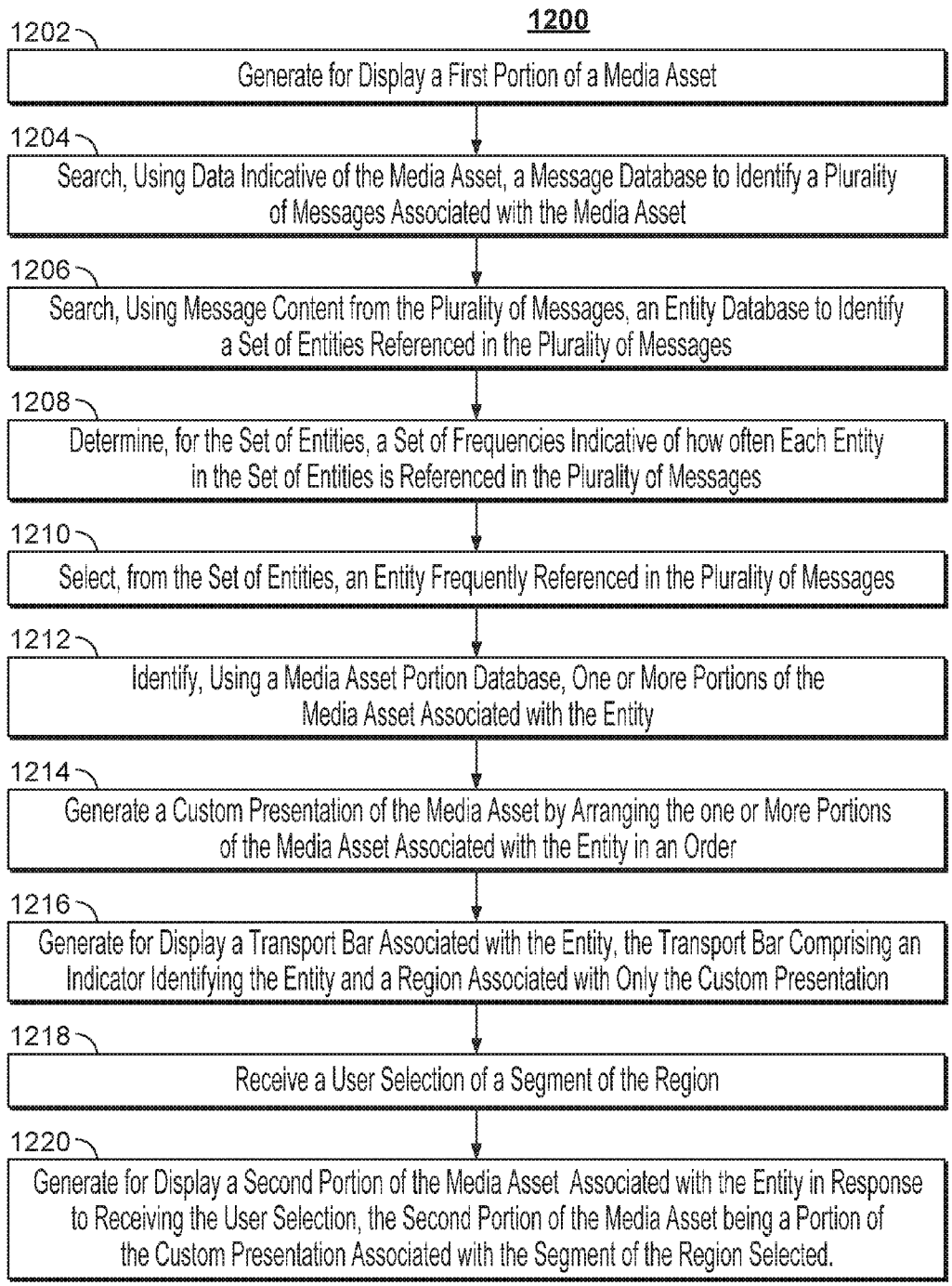
FIG. 12 is a flowchart of another set of illustrative steps for viewing and navigating customized media presentations, in accordance with some embodiments of the disclosure.

FIG. 12 is a flowchart of another set of illustrative steps for viewing and navigating customized media presentations, in accordance with some embodiments of the disclosure. For example, a media guidance application implementing process 1200 may be executed by control circuitry 904 (FIG. 9). It should be noted that process 1200 or any portion thereof could be performed on, or be provided by, any of the devices discussed in relation to FIG. 9 or FIG. 10, and utilize any of the databases or data structures discussed in relation to FIGS. 2-5. It should also be noted that process 1200 or any of the individual procedures discussed in relation to process 1200 may be combined with any of the other processes in this disclosure, including the processes discussed in relation to FIG. 11 or FIGS. 13-17. For example, individual procedures discussed in relation to process 1200 may be combined, whole or in part, with portions of process 1100 (FIG. 11).

Process 1200 begins at 1202, where the media guidance application generates for display (e.g., via control circuitry 904 (FIG. 9)) a first portion of a media asset. For example, the media guidance application may generate a display of a portion of a television show, film, book, video-game cut scene, or other type of media (e.g., generate a display of a portion of a film within content display area 122 of display screen 100 (FIG. 1)). In general, the first portion of the media asset may be displayed by the media guidance application concurrently with any number of other menus, overlays, or other graphics (e.g., the transport bars 102A and 102B and message region 124).

Process 1200 continues to 1204, where the media guidance application searches (e.g., via control circuitry 904 (FIG. 9)) using data indicative of the media asset, a message database (e.g., database 200 (FIG. 2)) to identify a plurality of messages associated with the media asset. For example, if the media asset is the film "Romeo and Juliet in Paris," the media guidance application may use the name of the film to search a message database (e.g., database 200 (FIG. 2)) for messages related to the film "Romeo and Juliet in Paris." Other types of data indicative of the media asset may be images taken from the media asset, audio samples from the media asset, audio or video fingerprint information, or media guidance data (e.g., data provided by a media guidance data source 1018 (FIG. 10)) such as a film identifier. In general, the message database may be a local database, or a remote database (e.g., stored within media guidance data source 1018 and accessed via communications network 1014 (FIG. 10)). The message database may be populated with messages taken from social media communications, online blogs, forums, fan pages, Internet websites, or the like. The messages in the database may include text, or supplemental content such as video, images, uniform resource locators (URLs), hyperlinks, message metadata, or the like. The messages in the database may be categorized according to the media assets associated with each of the messages (e.g., through the use of associated asset fields 210 within database 200 (FIG. 2)), allowing the media guidance application to easily search for and retrieve any messages associated with the media asset. For instance, the media guidance application may search the database 200 for message entries associated with the film "Romeo and Juliet in Paris," and receive the message entries 212 and 212 in response. The media guidance application may then retrieve the message text and any supplemental content from the identified message entries. In general, the database may have an API that may be used by the media guidance application to request the messages, or the database may respond to appropriately formatted search queries or SQL commands.

Process 1200 continues to 1206, where the media guidance application searches (e.g., via control circuitry 904 (FIG. 9)) using message content from the plurality of messages, an entity database (e.g., database 300 (FIG. 3)) to identify a set of entities referenced in the plurality of messages. For example, if the messages relate to the film "Romeo and Juliet in Paris," the messages may mention particular characters in the film, locations in the film, actors portraying characters in the film, objects and scenes within the film, or the like. In general, a set of entities referenced in the film may be contained within an entity database, along with descriptors for each of the entities. For example, the character "Juliet" may be stored associated with entity entry 312 in database 300, and contain various descriptors in entity descriptors fields 306 that may be used to refer to the character, such as variations of the character's first and last name: "Juliet," "Jules," and "Capulet." In this case, the media guidance application may compare the content from the messages to the descriptors for the entities listed in the database, and include "Juliet" in the set of entities if any of the messages include text with the descriptors "Juliet," "Jules," or "Capulet."

In some embodiments, the media guidance application may search (e.g., via control circuitry 904 (FIG. 9)) the entity database (e.g., database 300 (FIG. 3)) by identifying strings of text associated with the message content from the plurality of messages. For example, if one of the strings of text was "Jules is cute!," that string of text may be compared against the entity descriptors fields 306 of the entity entries 310-318 in database 300 to identify entity entries 310-318 with entity descriptors fields 306 that partially match, or are otherwise similar to, the text. The media guidance application then includes the associated entity of an entry in the set of entities in response to determining that at least a portion of the strings of text match at least a portion of the at least one descriptor of the entry. For example, if one of the strings of text was "Jules is cute!," the media guidance application may determine that a portion of the string of text "Jules is cute!" matches the entity descriptor "Jules," which is part of the entity entry 312 associated with the entity "Juliet." In this case, the entity "Juliet" may be included by the media guidance application in the set of entities. In general, there may be one or more strings of text associated with a given message, and any of the strings of text may be used to search for associated entities. If the message includes supplemental content, such as video, audio, uniform resource locators (URLs), or hyperlinks, the media guidance application may also extract text from the supplemental content using any number of techniques, and use that text to search for entities associated with the message. The media guidance application then compares the strings of text to entries in the entity database, each of the entries comprising an associated entity and at least one descriptor of the associated entity. Methods for determining entities referenced in messages, and extracting text from supplemental content, are also discussed in relation to FIG. 13.

Process 1200 continues to 1208, where the media guidance application determines (e.g., via control circuitry 904 (FIG. 9)), for the set of entities, a set of frequencies indicative of how often each entity in the set of entities is referenced in the plurality of messages. For example, if the set of entities included "Romeo," "Juliet," and "Eiffel Tower," the set of frequencies may indicate that 30% of the messages refer to "Romeo" and "Juliet," and 10% of the messages refer to the "Eiffel Tower." The media guidance application may determine the frequencies any number of ways. For example, the media guidance application may determine the number of messages that include text that matches a descriptor for a given entity, and divide this number by the total number of messages analyzed.

In some embodiments, the media guidance application determines (e.g., via control circuitry 904 (FIG. 9)) the set of frequencies by identifying strings of text associated with the message content from the plurality of messages. For example, the media guidance application may identify one or more strings of text included within the message, or identify strings of text from supplemental content included in the message (e.g., using a portion of process 1300 (FIG.

13)). The media guidance application then determines (e.g., via control circuitry 904 (FIG. 9)), for each entity in the set of entities, a number of the strings of text that include a descriptor of the entity. For example, the media guidance application may determine (e.g., via control circuitry 904 (FIG. 9)) that ten of the twenty identified strings reference the entity "Romeo," and five of the identified strings reference the entity "Juliet." The media guidance application then assigns (e.g., via control circuitry 904 (FIG. 9)), for each entity in the set of entities, a frequency in the set of frequencies based on the number. For example, the media guidance application may divide the number of strings that reference a given entity by the total number of strings to express the frequency as a percentage. In this case, the media guidance application may store a set of frequencies indicating that the entity "Romeo" was referenced in 50% of the identified strings, and "Juliet" was referenced in 25% of the identified strings. In some embodiments, the media guidance application may also store the set of frequencies by ranking the entities from the most frequent to the least frequent. For example, the entity "Romeo" may be assigned a "1" as the entity most frequently referenced in the plurality of messages, and the entity "Juliet" may be assigned a "2" as the entity second most frequently referenced in the plurality of messages.

Process 1200 continues to 1210, where the media guidance application selects (e.g., via control circuitry 904 (FIG. 9)), from the set of entities, an entity frequently referenced in the plurality of messages. For example, if the media guidance application determines that "Romeo" is the most frequently referenced entity in the set of entities, "Romeo" may be selected. As an alternate example, the media guidance application may select an entity at random from among the most popular entities (e.g., select an entity from the three most popular entities). As an alternate example, the media guidance application may use a weighting function to select an entity at random, but select more frequently referenced entities more frequently (e.g., select the most popular entity 50% of the time, the second most popular entity 35% of the time, and the third most popular entity 15% of the time).

In some embodiments, the media guidance application selects (e.g., via control circuitry 904 (FIG. 9)) an entity by identifying, from the set of entities, a subset of entities presented in the first portion of the media asset. For example, the set of entities may include "Romeo," "Juliet," "Mercutio," and "Tybalt." If the media guidance application determines that the first portion of the media asset features only the entities "Romeo" and "Juliet," and not "Mercutio" or "Tybalt," the media guidance application will select a subset of entities that includes only "Romeo" and "Juliet." The media guidance application then selects the entity from the subset of entities. For example, the media guidance application may select the entity from the subset of entities that includes only "Romeo" and "Juliet." In some embodiments, the media guidance application may determine the entities featured in a given portion of a media asset by searching a media asset portion database (e.g., database 400 (FIG. 4)). For instance, if the media guidance application determines that the first portion of the media asset is the "Eiffel Tower Scene" of the film "Romeo and Juliet in Paris" represented by asset portion entry 414 of database 400, the media guidance application may check the featured entity fields 410 to determine that the first portion of the media asset is associated with the entities "Romeo," "Juliet," "Tophat Man," and "Eiffel Tower."

Process 1200 continues to 1212, where the media guidance application identifies (e.g., via control circuitry 904 (FIG. 9)), using a media asset portion database (e.g., database 400 (FIG. 4)), one or more portions of the media asset associated with the entity. In general, the media asset portions in the media asset portion database may be categorized according to which entities are featured within the portion (e.g., via featured entity fields 410 of asset portion entries 414-418 of database 400 (FIG. 4)), allowing the media guidance application to easily search for and retrieve media asset portions featuring a given entity. For example, if the media guidance application selected "Romeo" as the entity, the media guidance application may search database 400 for entries associated with the entity "Romeo," and retrieve asset portion entries 414-418. In general, the database may have an API that may be used by the media guidance application to identify and retrieve the media asset portions, or the database may respond to appropriately formatted search queries or SQL commands.

In some embodiments, the media guidance application identifies (e.g., via control circuitry 904 (FIG. 9)) one or more portions of the media asset associated with the entity by accessing the media asset portion database (e.g., database 400 (FIG. 4)), the entries in the media asset portion database comprising an associated portion of the media asset (e.g., indicated by portion descriptor field 404, portion ID field 402, or a video file for the associated portion), a start time of the associated portion (e.g., start time field 406), an end time of the associated portion (e.g., end time field 408), and a list of entities depicted in the associated portion (e.g., the featured entity fields 410). For example, a typical entry in the database (e.g., asset portion entry 416) may be for a particular portion of the media asset "Romeo and Juliet in Paris." The entry may include a description of the portion "Dancing Scene," the normal start and end time of the portion within the original media asset, and a list of entities featured in the portion, including the characters "Romeo" and "Juliet." The media guidance application then selects (e.g., via control circuitry 904 (FIG. 9)) a plurality of entries from the media asset portion database, each of the selected entries comprising the entity in the list of entities. For example, if the entity was "Romeo," the media guidance application would select asset portion entries 414-418 of database 400 that include "Romeo" in the featured entity fields 410. The media guidance application then selects (e.g., via control circuitry 904 (FIG. 9)), as the one or more portions of the media asset associated with the entity, associated portions of the media asset from the plurality of entries selected. For example, if the media guidance application selected the asset portion entry 416 associated with the portion "Dancing Scene," that portion of the media asset corresponding to "Dancing Scene" would be selected as one of the portions of the media asset associated with the entity "Romeo."

In some embodiments, the media guidance application identifies (e.g., via control circuitry 904 (FIG. 9)) one or more portions of the media asset associated with the entity by accessing a database of media asset playlists, each entry in the database comprising an associated playlist of media asset portions (e.g., presentation playlist 512 of custom presentation 500 (FIG. 5)), and a list of entities depicted in the media asset portions (e.g., associated entity information fields 510 of custom presentation 500 (FIG. 5)). For example, an entry in the database may be for a playlist of media asset portions featuring the entities "Romeo" and "Juliet." The media guidance application then selects (e.g., via control circuitry 904 (FIG. 9)), from the database, an entry, wherein the entity is included in the list of entities of the entry selected. For example, if the entity was "Romeo,"

the entry representing a playlist of media asset portions featuring the entities "Romeo" and "Juliet" may be selected. The media guidance application then identifies (e.g., via control circuitry 904 (FIG. 9)) media asset portions within the associated playlist of the entry selected as the one or more portions of the media asset associated with the entity. For example, if the media guidance application selected an entry for presentation playlist 512, the media asset portions within the playlist (e.g., the media asset portions associated with asset portion entries 522-526 (FIG. 5)) would be selected.

Process 1200 continues to 1214, where the media guidance application generates (e.g., via control circuitry 904 (FIG. 9)) a custom presentation of the media asset by arranging the one or more portions of the media asset associated with the entity in an order. For example, if the media guidance application identified portions of the media asset featuring the entity "Romeo," those identified portions of the media asset may be arranged together into a single custom presentation (e.g., custom presentation 500 (FIG. 5)). The order may be based on the original presentation order of the identified portions of the media asset. For example, the portions of the media asset that are normally presented earlier in the original media asset may be arranged earlier in the custom presentation. For instance, because the portion "Eiffel Tower Scene" appears earlier in the film "Romeo and Juliet in Paris" than the portion "Dancing Scene," the media guidance application may create a custom presentation 500 with a presentation playlist 512 where the "Eiffel Tower Scene" appears earlier than the "Dancing Scene" (e.g., as indicated by the presentation order information field 514 for asset portion entry 522 being a lower number than for asset portion entry 524). As an alternate example, the order of the media asset portions may be selected to conform to a user description of the media asset, or chronologically according to the sequence of events portrayed within the media asset. For instance, a convoluted plotline involving several flashbacks and flash-forwards may be arranged chronologically, rather than in the order that they are normally presented in the original media asset. As an alternate example, if a media asset is discussed on a forum or blog, the portions of the media asset referenced earlier in the discussion may be placed earlier within the custom presentation.

Process 1200 continues to 1216, where the media guidance application generates for display (e.g., via control circuitry 904 (FIG. 9)), a transport bar associated with the entity, the transport bar comprising an indicator identifying the entity, and one or more regions associated with the custom presentation (e.g., indicator 106A and region 108A of transport bar 102A (FIG. 1)). For example, if the entity is the character "Romeo," the indicator may be the name of the character, an image of the character's face, an image of a distinguishing feature of the character such as his clothing or accessories, a color-coded highlight region matching a highlight region presented around the character in the media asset, or any other suitable type of visual indicator. The region may represent the custom presentation, and may allow the user to navigate to different media asset portions of the custom presentation.

In some embodiments, the region comprises a plurality of sub-regions (e.g., sub-region 110A of region 108A of transport bar 102A (FIG. 1)), each of the sub-regions being associated with a different portion of the media asset within the custom presentation. For example, if the custom presentation (e.g., custom presentation 500) includes five distinct portions of the media asset, each of those five portions may be represented by a distinct sub-region within the transport bar. In general, the region may also include an indicator (e.g., play position indicator 112A (FIG. 1)) of the current play position within the custom presentation.

Process 1200 continues to 1218, where the media guidance application receives (e.g., via control circuitry 904 (FIG. 9)) a user selection (e.g., via user input interface 910 (FIG. 9)) of a segment of the region. For example, a user may use a mouse, keyboard, remote control, voice commands, gestures, or other suitable input to select a segment of the region. For instance, the user may use a mouse to select a particular segment of the region, and the media guidance application may receive (e.g., via control circuitry 904 (FIG. 9)) the user selection of that segment. In some embodiments, when the region is divided into sub-regions (e.g., sub-region 110A of region 108A (FIG. 1)), the user selection of the segment of the region indicates one of the plurality of sub-regions. For example, a user may use a remote control to highlight and select one of the plurality of sub-regions, and the media guidance application may receive the user selection of the sub-region.

Process 1200 continues to 1220, where the media guidance application generates for display (e.g., via control circuitry 904 (FIG. 9)) a second portion of the media asset associated with the entity in response to receiving the user selection (e.g., via user input interface 910 (FIG. 9)), the second portion of the media asset being a portion of the custom presentation associated with the segment of the region selected. For example, if the selected segment indicated a particular play position within the custom presentation (e.g., by selecting a play position within the sub-region 110A (FIG. 1)), the media guidance application may begin displaying the media asset starting from that play position. For instance, if the media guidance application receives a user selection of a play position halfway through the sub-region 110A representing the "Dancing Scene" of the media asset "Romeo and Juliet in Paris," the media guidance application may begin playback halfway through the portion of the media asset associated with the "Dancing Scene." In some embodiments, when the selected segment indicates a sub-region, the second portion of the media asset is associated with the sub-region indicated by the user selection. For example, if the user selection indicated the sub-region 110A representing the "Dancing Scene" portion of the media asset "Romeo and Juliet in Paris," the media guidance application may generate a display of the "Dancing Scene" portion of the media asset "Romeo and Juliet in Paris."

In some embodiments, the media asset is a first media asset, and the media guidance application identifies (e.g., via control circuitry 904 (FIG. 9)), using a media asset portion database (e.g., database 400 (FIG. 4)), one or more portions of a second media asset associated with the entity. For example, if the entity is "Romeo," and the first media asset is the film "Romeo and Juliet in Paris," the media guidance application may identify portions of a second media asset also associated with the entity "Romeo," such as the portions of the film "Romeo and Juliet in London." In general, the media guidance application may determine multiple media assets associated with a particular entity through an entity database (e.g., database 300 (FIG. 3)). For instance, the media guidance application may use the associated asset fields 308 for entity entry 310 representing the entity "Romeo" in order to determine that the assets "Romeo and Juliet in Paris" and "Romeo and Juliet in London" are both associated with the entity "Romeo." The media guidance application then generates a second custom presentation of the second media asset by arranging the one or more portions of the second media asset associated with the entity in a second order. For example, if the media guidance application selected portions of the film "Romeo and Juliet in London" as the portions of the second media asset, the media guidance application may generate a second custom presentation by arranging the selected portions of the film "Romeo and Juliet in London," in chronological order. The media guidance application then generates for display a second transport bar associated with the entity, the second transport bar comprising the indicator identifying the entity and a second region associated with only the second custom presentation. For example, the media guidance application may display a second transport bar identifying the entity "Romeo" (e.g., similar to the indicator 106A of transport bar 102A (FIG. 1)) and including a second region associated with the second custom presentation generated from portions of the film "Romeo and Juliet in London."

In some embodiments, the media guidance application generates a third custom presentation by arranging (e.g., via control circuitry 904 (FIG. 9)) the one or more portions of the first media asset and the one or more portions of the second media asset in a third order. For example, the media guidance application may arrange portions of both of the films "Romeo and Juliet in Paris" and "Romeo and Juliet in London" into a single custom presentation. The media guidance application then generates for display (e.g., via control circuitry 904 (FIG. 9)) a third transport bar associated with the entity, the third transport bar comprising the indicator identifying the entity and a third region associated with only the third custom presentation. For example, the media guidance application may display a third transport bar that identifies the entity "Romeo" (e.g., similar to the indicator 106A of transport bar 102A (FIG. 1)) and includes a region associated with the custom presentation generated from portions of both of the films "Romeo and Juliet in Paris" and "Romeo and Juliet in London."

In some embodiments, the entity is a first entity, and the media guidance application selects (e.g., via control circuitry 904 (FIG. 9)), from the set of entities, a second entity frequently referenced in the plurality of messages. For example, if the first entity is the entity "Romeo," the media guidance application may select the entity "Juliet" as the second entity frequently referenced in the plurality of messages. The media guidance application then identifies (e.g., via control circuitry 904 (FIG. 9)), using the media asset portion database (e.g., database 400 (FIG. 4)), one or more portions of the media asset associated with both the first entity and the second entity. For example, the media guidance application may identify portions of the media asset "Romeo and Juliet in Paris" featuring both of the entities "Romeo," and "Juliet" by searching for asset portion entries 414-418 of database 400 that include both of the entities "Romeo" and "Juliet" in the featured entity fields 410. The media guidance application then generates a second custom presentation of the media asset by arranging the one or more portions of the media asset associated with both the first entity and the second entity in a second order. For example, the media guidance application may have identified portions of the film "Romeo and Juliet in Paris" associated with asset portion entries 414 and 416 that feature both of the entities "Romeo" and "Juliet" and may generate a custom presentation by arranging those portions in chronological order. The media guidance application then generates for display a second transport bar associated with both the first entity and the second entity, the second transport bar comprising a second indicator identifying both the first entity and the second entity and a second region associated with only the second custom presentation. For example, the media guidance application may display a transport bar that includes an indicator identifying both "Romeo" and "Juliet" (e.g., similar to the indicator 106A of transport bar 102A (FIG. 1)) and a region representing the custom presentation generated from portions of the film "Romeo and Juliet in Paris" featuring both of the entities "Romeo" and "Juliet."

It is contemplated that the steps or descriptions of FIG. 12 may be used with any other embodiment of this disclosure. For example, portions of FIG. 12 may be used to supplement process 1100 (FIG. 11). In addition, the steps and descriptions described in relation to FIG. 12 may be done in alternative orders or in parallel to further the purposes of this disclosure. For example, a media guidance application may generate for display a transport bar at 1216, while simultaneously searching message content at 1206. This may allow the media guidance application to display a transport bar based on analyzing only a portion of the message content available, and update the transport bar periodically as additional content is searched. Furthermore, it should be noted that any of the devices or equipment discussed in relation to FIG. 9 or FIG. 10 or the databases or data structures discussed in relation to FIGS. 2-5 could be used to perform one or more of the steps in FIG. 12.

Figure 13:
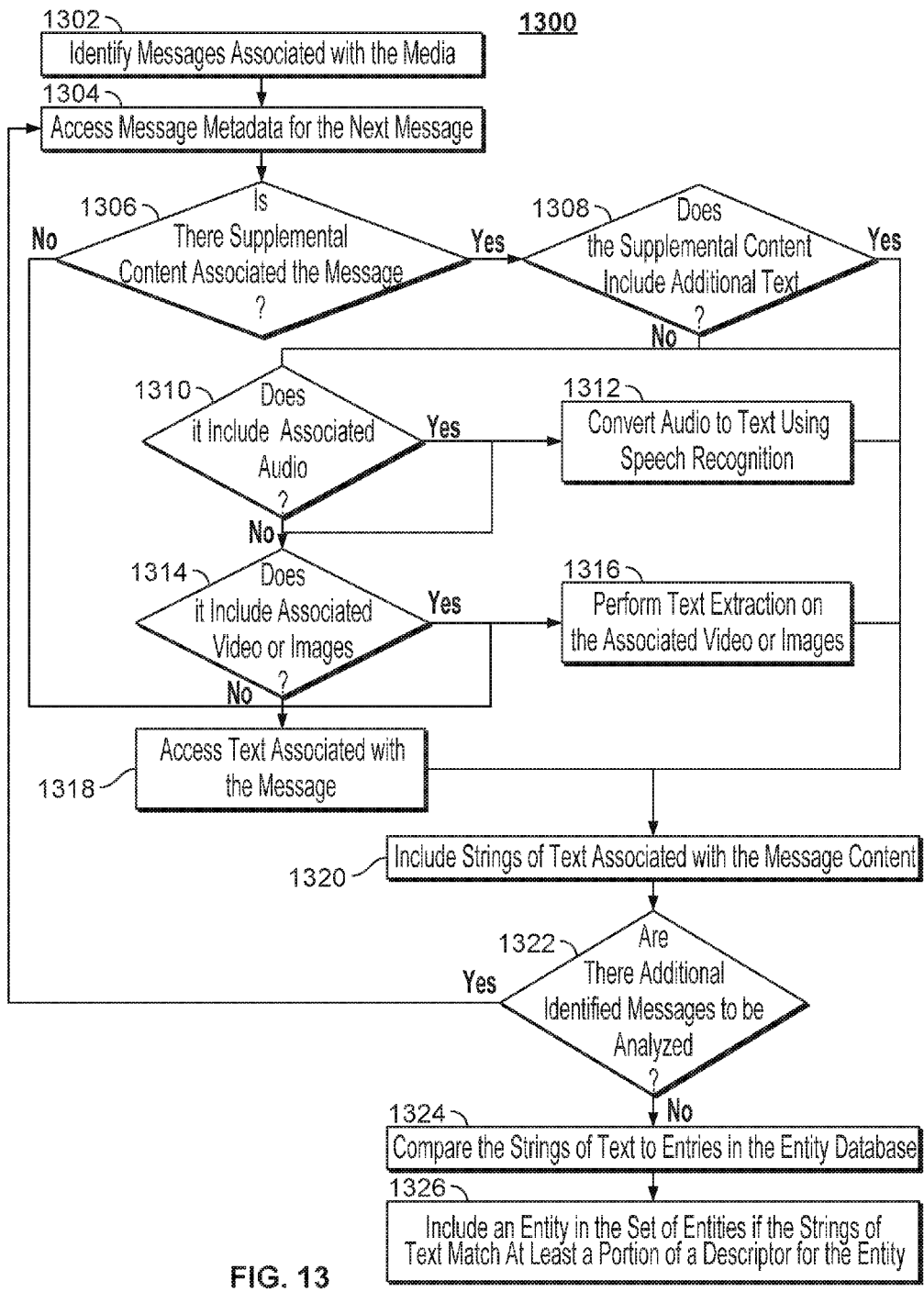
FIG. 13 is a flowchart of illustrative steps for identifying strings of text associated with messages, in accordance with some embodiments of the disclosure.

FIG. 13 is a flowchart of illustrative steps for identifying strings of text associated with messages, in accordance with some embodiments of the disclosure. For example, a media guidance application implementing process 1300 may be executed by control circuitry 904 (FIG. 9). It should be noted that process 1300 or any portion thereof could be performed on, or be provided by, any of the devices discussed in relation to FIG. 9 or FIG. 10, and utilize any of the databases or data structures discussed in relation to FIGS. 2-5. It should also be noted that process 1300 or any of the individual procedures discussed in relation to process 1300 may be combined with any of the other processes in this disclosure, including the processes discussed in relation to FIG. 11, FIG. 12, or FIGS. 14-17.

Process 1300 begins at 1302, where the media guidance application identifies (e.g., via control circuitry 904 (FIG. 9)) messages associated with the media. The media guidance application may retrieve the messages from a local storage device (e.g., storage 908 (FIG. 9)), from a remote location (e.g., from media guidance data source 1018 via communications network 1014 (FIG. 10)), or from any other convenient location. In some embodiments, the messages are identified from a message database (e.g., database 200 (FIG. 2)). For example, if the media is the film "Romeo and Juliet in Paris," the media guidance application may search database 200 to identify messages associated with the film "Romeo and Juliet in Paris," and identify the message entries 212 and 214.

Process 1300 continues to 1304, where the media guidance application accesses (e.g., via control circuitry 904 (FIG. 9)) message metadata for the next message. For example, if the messages are taken from the message entries 212 and 214, the media guidance application may retrieve any of the data contained in the information fields 202-210 associated with the next message entry to be analyzed. In general, the message metadata may be stored in a same, or different, database from the message itself. For instance, the message metadata may be stored in a private database housed on a media guidance data source (e.g., media guidance data source 1018), while the actual message content may be stored in a separate public database.

Process 1300 continues to 1306, where the media guidance application determines (e.g., via control circuitry 904

(FIG. 9)) if there is supplemental content associated with the message. For example, if the media guidance application is analyzing message entries from database 200 (FIG. 2), the media guidance application may determine if there is any information listed in the supplemental content field 206. If there is no supplemental content associated with the message, process 1300 proceeds to 1318. If there is supplemental content associated with the message, process 1300 proceeds to 1308 instead. For instance, if the media guidance application is analyzing message entry 212, the media guidance application may determine that there is not supplemental content associated with the message, and process 1300 may proceed to 1318. As an alternate example, if the media guidance application is analyzing message entry 214, the media guidance application may determine that there is supplemental content associated with the message, as indicated by the image file "Tophatman.jpg" listed in the supplemental content information field 206 and will proceed to 1308 instead.

Process 1300 may continue to 1308, where the media guidance application determines (e.g., via control circuitry 904 (FIG. 9)) if the supplemental content includes additional text. For example, if the media guidance application determines that the supplemental content is a hyperlink or a uniform resource locator (URL) linking to an external data file associated with the message. This may, for example, include links to transcripts of audio content, images from the content, written excerpts from a media asset, commentary on the media asset, or any other suitable type of file. For instance, the media guidance application may access a webpage associated with the URL and retrieve any text contained on the webpage. If the supplemental content does include text, the text is included by the media guidance application in the strings of text associated with the message content at 1320. Whether or not the supplemental content includes text, process 1300 may then proceed to 1310.

Process 1300 continues to 1310, where the media guidance application determines (e.g., via control circuitry 904 (FIG. 9)) if the supplemental content includes associated audio. For example, the media guidance application may determine that the message includes associated audio of a user describing the media asset, or the audio itself may be recorded from the media asset. In response to determining that the message includes associated audio, process 1300 proceeds to 1312 and 1314. Alternately, in response to determining that the supplemental content does not include associated audio, process 1300 continues directly to 1314.

Process 1300 may continue to 1312, where the media guidance application converts (e.g., via control circuitry 904 (FIG. 9)) audio to text using speech recognition. The media guidance application may then include this text in the strings of text associated with the message content at 1320. This may include processing the received audio locally (e.g., via control circuitry 904 (FIG. 9)) on the same device running the media guidance application, or transmitting the received audio to an external service (e.g., via communications circuitry 1010 (FIG. 10)) to be converted. For example, if the audio was a recording a user commenting on the appearance of a particular entity, the media guidance application may apply speech recognition to the audio and convert the audio to the text string "Romeo is holding a rose." In this instance, the media guidance application may then include the text string "Romeo is holding a rose" in the strings of text associated with the message content at 1320.

Process 1300 continues to 1314, where the media guidance application determines (e.g., via control circuitry 904 (FIG. 9)) if the supplemental content includes associated video or images. For example, the supplemental content may include a photograph or short video included in the message by the user. In response to determining that the supplemental content includes video or images, process 1300 proceeds to 1316 and 1318. Alternately, in response to determining that the supplemental content does not include associated video or images, process 1300 continues directly to 1318.

Process 1300 may continue to 1316, where the media guidance application performs text extraction (e.g., via control circuitry 904 (FIG. 9)) on the associated video or images. In general, the media guidance application may use any suitable type of optical character recognition or text extraction techniques, and may either process the data locally (e.g., via control circuitry 904 (FIG. 9)) or transmit the data to an external service (e.g., via communications circuitry 1010 (FIG. 10)) to be processed. The media guidance application may then include any text extracted in the strings of text associated with the message content at 1320.

In some embodiments, the media guidance application may directly use the text or video to identify entities to be included in the set of entities. For example, the media guidance application may use an image search to identify entities contained within the images or the frames of the video. For instance, if the supplemental content includes the image file "Tophatman.jpg" the media guidance application may transmit the data to an external service (e.g., via communications circuitry 1010 (FIG. 10)) to be processed, and receive back the identity of any entities depicted in the image.

In some embodiments, the media guidance application may use audio or video fingerprinting to identify entities associated with a message. For example, if the supplemental content is an audio file, the media guidance application may determine if the audio file corresponds to a portion of a media asset. For instance, if the media guidance application determines that the audio file is a recording of the character "Romeo" singing a song from the film "Romeo and Juliet," the media guidance application may directly include the entity "Romeo" in the list of entities associated with the message.

Process 1300 continues to 1318, where the media guidance application accesses (e.g., via control circuitry 904 (FIG. 9)) text associated with the message. For example, if the media guidance application identified the messages from within a message database (e.g., database 200 (FIG. 2)), the media guidance application may search for any information fields containing the text of the message (e.g., message text field 204). The media guidance application may then include this text in the strings of text associated with the message content at 1320.

Process 1300 continues to 1320, where the media guidance application includes (e.g., via control circuitry 904 (FIG. 9)) the strings of text identified at 1308, 1312, 1316, or 1318 in the text associated with the message. For example, if the media guidance application determined that a particular message included the message text "Jules is Cute," and supplemental content that included the audio of a user commenting that "Jules and Romeo are awesome together," all of these strings of text may be included in the text associated with the message, and may be used to search for entities associated with the message.

Process 1300 continues to 1322, where the media guidance application determines (e.g., via control circuitry 904 (FIG. 9)) if there are additional messages to be analyzed. For example, if the media guidance application originally identified multiple messages at 1302, process 1300 will return to 1304 and the media guidance application will continue to analyze messages in order to identify strings associated with each respective message. Once all of the identified messages have been analyzed in a similar fashion, process 1300 continues to 1324.

Process 1300 continues to 1324, where the media guidance application compares (e.g., via control circuitry 904 (FIG. 9)) the strings of text to entries in an entity database (e.g., database 300 (FIG. 3)). For example, the media guidance application may compare the strings of text associated with the message content with descriptors for the entities listed in the entity database (e.g., entity descriptor fields 306 of the entity entries 310-318 in database 300 (FIG. 3)). For example, if the media guidance application determined that a particular message included the message text "Jules is Cute," this text may be compared against the descriptors for the entities in the entity database.

Process 1300 continues to 1326, where the media guidance application includes (e.g., via control circuitry 904 (FIG. 9)) an entity in the set of entities if the strings of text match at least a portion of a descriptor for the entity. For instance, if one of the strings of text was "Jules is Cute," the media guidance application may determine that this matches an entity descriptor for the entity "Juliet" represented by entity entry 312 in database 300 (FIG. 3). In this case, the media guidance application may include the entity "Juliet" in the set of entities.

In some embodiments, the media guidance application identifies an entity (e.g., via control circuitry 904 (FIG. 9)) referenced by the message indirectly, and includes this entity in the set of entities. For example, the media guidance application may receive a message referencing "the building in the Romeo and Juliet movie that was also in that Woody Allen movie," and determine that the message indirectly references the entity "Eiffel Tower," which is featured in both the film "Romeo and Juliet in Paris," as well as the film "Midnight in Paris" directed by Woody Allen. This may enable the media guidance application to determine entities associated with a message, even when the message doesn't contain an explicit descriptor of the entity (e.g., a descriptor listed in database 300 (FIG. 3)).

In some embodiments, the media guidance application may identify an entity (e.g., via control circuitry 904 (FIG. 9)) referenced by the message indirectly based on a knowledge graph representing relationships between entities. For example, a knowledge graph may include an entry for the entity "Woody Allen" that is connected to entries representing each of the films that the entity "Woody Allen" is involved with (e.g., the film "Midnight in Paris" that was written and directed by "Woody Allen"). Similarly, knowledge graph entries for a particular media asset may be connected to entries representing entities associated with the media asset, such as actors, directors, writers, depicted characters, landmarks, locations, plot lines, and the like. For instance, the knowledge graph entry for the film "Midnight in Paris" may have a connection to an entry for the entity "Eiffel Tower," which is a landmark depicted in the film. In general, any of the entries in the knowledge graph may be supplemented by any suitable type of metadata, such as any of the metadata contained in an entity database (e.g., database 300 (FIG. 3)). For instance, the knowledge graph entry for the entity "Eiffel Tower" may indicate that it is a building and a Paris landmark associated with the films "Romeo and Juliet in Paris," and "Midnight in Paris," among others. In this case, the media guidance application may determine that the entity "Eiffel Tower" is indirectly referenced by the message "the building in the Romeo and Juliet movie that was also in that Woody Allen movie," by retrieving knowledge graph entries associated with the director "Woody Allen," and the characters "Romeo," and "Juliet," and searching for connections to a common building or landmark that is featured in both a movie associated with "Woody Allen," and a movie associated with the characters "Romeo and Juliet."

It is contemplated that the steps or descriptions of FIG. 13 may be used with any other embodiment of this disclosure. For example, portions of FIG. 13 may be used to determine entities referenced in a plurality of messages, and may be incorporated into subprocess 1106 of process 1100 (FIG. 11), or subprocess 1206 of process 1200 (FIG. 12). In addition, the steps and descriptions described in relation to FIG. 13 may be done in alternative orders or in parallel to further the purposes of this disclosure. For example, a media guidance application may simultaneously determine if supplemental content includes text, audio, or video at 1308, 1310, and 1314, and thereby reduce the overall computation time of process 1300. Furthermore, it should be noted that any of the devices or equipment discussed in relation to FIG. 9 or FIG. 10 or the databases or data structures discussed in relation to FIGS. 2-5 could be used to perform one or more of the steps in FIG. 13.

FIG. 14 is a flowchart of illustrative steps for using a media asset portion database to generate a custom presentation, in accordance with some embodiments of the disclosure. For example, a media guidance application implementing process 1400 may be executed by control circuitry 904 (FIG. 9). It should be noted that process 1400 or any portion thereof could be performed on, or be provided by, any of the devices discussed in relation to FIG. 9 or FIG. 10, and utilize any of the databases or data structures discussed in relation to FIGS. 2-5. It should also be noted that process 1400 or any of the individual procedures discussed in relation to process 1400 may be combined with any of the other processes in this disclosure, including the processes discussed in relation to FIGS. 11-13 or FIGS. 15-17. For example, a portion of process 1400 may be used to create a custom presentation, and the media guidance application may then display a transport bar with a region corresponding to the media asset portions within the custom presentation (e.g., as part of process 1100 (FIG. 11), process 1200 (FIG. 12), process 1600 (FIG. 16) or process 1700 (FIG. 17)).

Process 1400 begins at 1402, where the media guidance application accesses (e.g., via control circuitry 904 (FIG. 9)) a media asset portion database (e.g., database 400 (FIG. 4)). In some embodiments, database 400 may be stored within the memory of a user device (e.g., within storage 908 (FIG. 9)). In some embodiments, the database 400 may be a remote database (e.g., stored within media content source 1016 or media guidance data source 1018 (FIG. 10)), which may be accessed over the Internet or a communications network (e.g., over the communications network 1014 (FIG. 10)) using an appropriate API.

Process 1400 continues to 1404, where the media guidance application selects (e.g., via control circuitry 904 (FIG. 9)) a plurality of entries from the media asset portion database (e.g., database 400 (FIG. 4)) that include the entity. For example, if the entity was the character "Tophat Man" from the film "Romeo and Juliet in Paris," the media guidance application may search for asset portion entries 414-418 of database 400 that include the entity "Tophat Man" in the featured entity fields 410.

Process 1400 continues to 1406, where the media guidance application generates (e.g., via control circuitry 904 (FIG. 9)) a custom presentation (e.g., custom presentation 500 (FIG. 5)) from the media asset portions in the selected entries. For example, if the media guidance application selected the asset portion entries 414 and 418 featuring the entity "Tophat Man," the media guidance application may use the media asset portions associated with those entries to generate a custom presentation (e.g., to populate a presentation playlist similar to presentation playlist 512 of custom presentation 500).

It is contemplated that the steps or descriptions of FIG. 14 may be used with any other embodiment of this disclosure. For example, portions of FIG. 14 may be used to identify the media asset portions to populate the custom presentation layout 612 in custom presentation creation screen 600 (FIG. 6). As an alternate example, portions of FIG. 14 may be used to generate a custom presentation at subprocess 1214 of process 1200 (FIG. 12), or as an intermediary step in generating a display of a transport bar region (e.g., region 108B of transport bar 102B (FIG. 1)) associated with the portions of the media asset within the custom presentation. In addition, the steps and descriptions described in relation to FIG. 14 may be done in alternative orders or in parallel to further the purposes of this disclosure. For example, a media guidance application may simultaneously generate a custom presentation at 1406 while continuing to select additional entities at 1404. This may allow the media guidance application to reduce the overall computation time of process 1400, by simply adding any additional entities to the existing custom presentation as they are selected. Furthermore, it should be noted that any of the devices or equipment discussed in relation to FIG. 9 or FIG. 10 or the databases or data structures discussed in relation to FIGS. 2-5 could be used to perform one or more of the steps in FIG. 14.

FIG. 15 is a flowchart of illustrative steps for using playlists to identify media asset portions to be included in a custom presentation, in accordance with some embodiments of the disclosure. For example, a media guidance application implementing process 1500 may be executed by control circuitry 904 (FIG. 9). It should be noted that process 1500 or any portion thereof could be performed on, or be provided by, any of the devices discussed in relation to FIG. 9 or FIG. 10, and utilize any of the databases or data structures discussed in relation to FIGS. 2-5. It should also be noted that process 1500 or any of the individual procedures discussed in relation to process 1500 may be combined with any of the other processes in this disclosure, including the processes discussed in relation to FIGS. 11-14, FIG. 16, or FIG. 17. For example, a portion of process 1500 may be used to create a custom presentation, and the media guidance application may then display a transport bar with a region corresponding to the media asset portions within the custom presentation (e.g., as part of process 1100 (FIG. 11), process 1200 (FIG. 12), process 1600 (FIG. 16), or process 1700 (FIG. 17)).

Process 1500 begins at 1502, where the media guidance application accesses (e.g., via control circuitry 904 (FIG. 9)) a database of media asset playlists. In general, the database of media asset playlists may be stored within the memory of a user device (e.g., within storage 908 (FIG. 9)), or in a remote location (e.g., stored within media content source 1016 or media guidance data source 1018 (FIG. 10)), which may be accessed over the Internet or a communications network (e.g., over the communications network 1014 (FIG. 10)) using an appropriate API. The playlists within the database may be similar to presentation playlist 512 (FIG. 5), and may be stored within the database as part of a custom presentation (e.g., similar to presentation playlist 512 portion of custom presentation 500 (FIG. 5)). In general, the media asset playlists stored within the database may be user-created, generated by content creators, or automatically created by a computer program or other automated system (e.g., a media guidance application).

Process 1500 continues to 1504, where the media guidance application selects (e.g., via control circuitry 904 (FIG. 9)) a playlist associated with the entity. For example, the presentation playlists may be stored in the database along with information indicative of entities associated with the playlists (e.g., the associated entity information fields 510 corresponding to presentation playlist (FIG. 5)). In this case, the media guidance application may simply search the database for presentation playlists associated with a given entity. For instance, if presentation playlist 512 was stored in the database, the media guidance application may select presentation playlist 512 by searching for entries associated with the entity "Romeo."

Process 1500 continues to 1506, where the media guidance application identifies (e.g., via control circuitry 904 (FIG. 9)) media asset portions from the playlist to be included in a custom presentation. For instance, if the media guidance application identified presentation playlist 512, the media guidance application may identify the media asset portions from the asset portion entries 522-526 within the presentation playlist 512. These identified media asset portions may then be incorporated into a custom presentation, such as custom presentation 500 (FIG. 5).

It is contemplated that the steps or descriptions of FIG. 15 may be used with any other embodiment of this disclosure. For example, portions of FIG. 15 may be used to identify the media asset portions to populate the custom presentation layout 612 in custom presentation creation screen 600 (FIG. 6). As an alternate example, portions of FIG. 15 may be used to generate a custom presentation at subprocess 1214 of process 1200 (FIG. 12), or as an intermediary step in generating a display of a transport bar region (e.g., region 108B of transport bar 102B (FIG. 1)) associated with the portions of the media asset within the custom presentation. In addition, the steps and descriptions described in relation to FIG. 15 may be done in alternative orders or in parallel to further the purposes of this disclosure. For example, a media guidance application may simultaneously generate a custom presentation at 1506 while continuing to select additional playlists at 1504. This may allow the media guidance application to create custom presentations that incorporate media asset portions from multiple separate playlists, and reduce overall computation time while doing so. Furthermore, it should be noted that any of the devices or equipment discussed in relation to FIG. 9 or FIG. 10 or the databases or data structures discussed in relation to FIGS. 2-5 could be used to perform one or more of the steps in FIG. 15.

Figure 16:
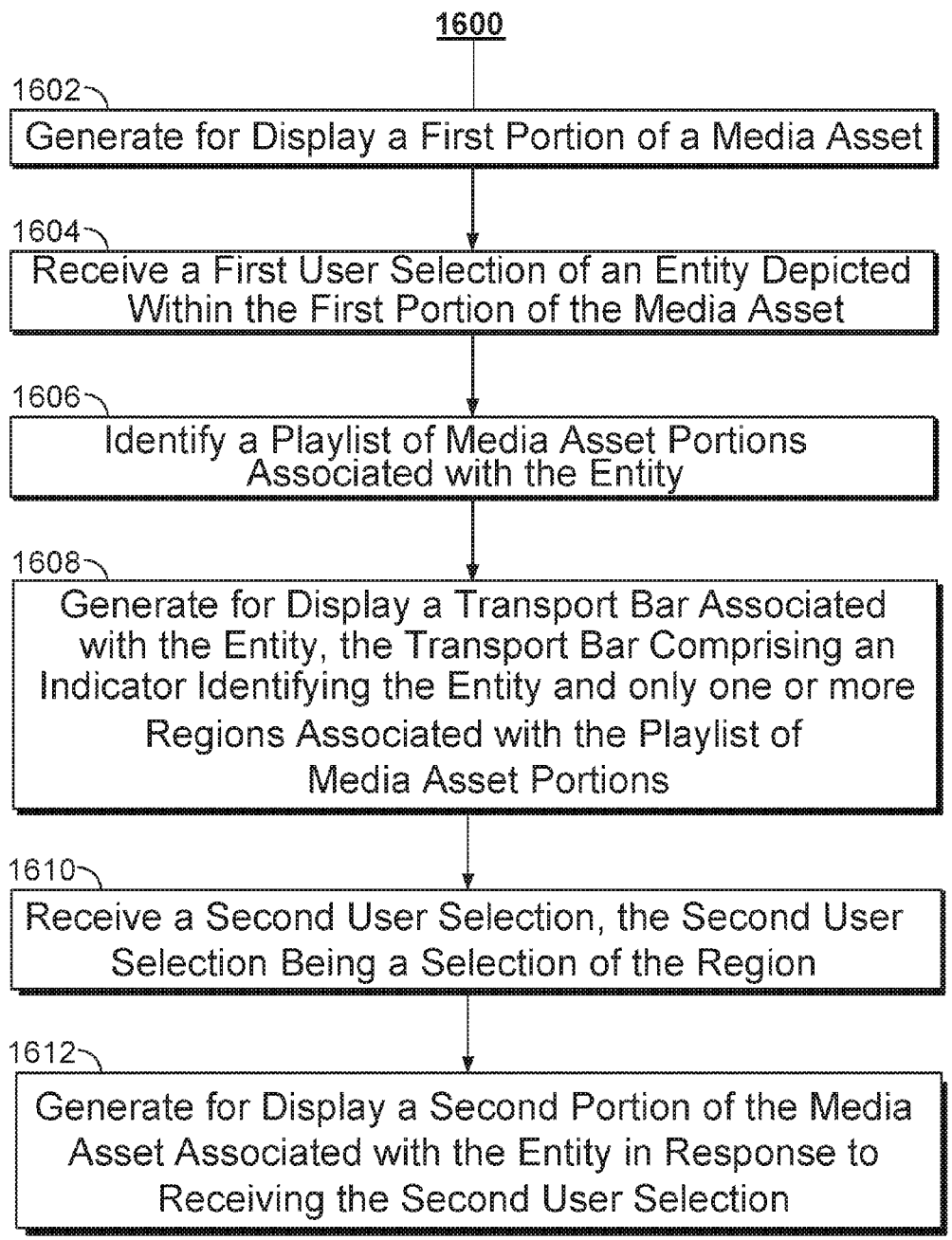
FIG. 16 is a flowchart of another set of illustrative steps for viewing and navigating customized media presentations, in accordance with some embodiments of the disclosure.

FIG. 16 is a flowchart of illustrative steps for viewing and navigating customized media presentations, in accordance with some embodiments of the disclosure. For example, a media guidance application implementing process 1600 may be executed by control circuitry 904 (FIG. 9). It should be noted that process 1600 or any portion thereof could be performed on, or be provided by, any of the devices discussed in relation to FIG. 9 or FIG. 10, and utilize any of the databases or data structures discussed in relation to FIGS. 2-5. It should also be noted that process 1600 or any of the individual procedures discussed in relation to process 1600 may be combined with any of the other processes in this disclosure, including the processes discussed in relation to FIGS. 12-15 and FIG. 17.

Process 1600 begins at 1602, where the media guidance application generates for display (e.g., via control circuitry 904 (FIG. 9)) a first portion of a media asset. For example, the media guidance application may generate a display of a portion of a film, on-demand video, Internet video stream, book, video-game cut scene, or other type of media (e.g., generate a display of a portion of a film within content display area 122 of display screen 100 (FIG. 1)). In general, the first portion of the media asset may be displayed by the media guidance application concurrently with any number of other menus, overlays, or other graphics (e.g., the transport bars 102A and 102B and message region 124). Alternately, the media guidance application may display any number of other menus, overlays, or other graphics (e.g., the transport bars 102A and 102B and message region 124) in response to receiving user selections and user input.

Process 1600 continues to 1604, where the media guidance application receives (e.g., via control circuitry 904 (FIG. 9)) a first user selection of an entity depicted within the first portion of the media asset. For example, if the media asset is the film "Romeo and Juliet in Paris," featuring the character "Juliet," the media guidance application may receive a user selection of the entity "Juliet." In general, the first user selection may be made using any convenient user input interface (e.g., user input interface 910).

Process 1600 continues to 1606, where the media guidance application identifies (e.g., via control circuitry 904 (FIG. 9)) a playlist of media asset portions associated with the entity. For example, the media guidance application may use the name of the entity "Juliet" to search a media asset playlist database (e.g., a database with entries corresponding to playlists such as presentation playlist 512 (FIG. 5)), or a custom presentation database (e.g., a database with entries corresponding to custom presentation such as custom presentation 500, which may include presentation playlist 512 (FIG. 5)). The media guidance application may then identify a playlist of media asset portions associated with the entity "Juliet" from the matching entries.

Process 1600 continues to 1608, where the media guidance application generates for display (e.g., via control circuitry 904 (FIG. 9)) a transport bar associated with the entity, the transport bar comprising an indicator identifying the entity and only one or more regions associated with the playlist of media asset portions. For example, if the media guidance application received a first user selection of the entity "Juliet" from the film "Romeo and Juliet in Paris," the media guidance application may generate a display of a transport bar (e.g., transport bar 102A (FIG. 1)) that indicates the identity of the entity "Juliet" (e.g., indicator 106A (FIG. 1)), and contains a region associated with the playlist of media asset portions associated with the entity "Juliet" (e.g., region 108A (FIG. 1)).

Process 1600 continues to 1610, where the media guidance application receives (e.g., via control circuitry 904 (FIG. 9)) a second user selection, the second user selection being a selection of the region. For example, the user may use a mouse to select a particular segment of the region, and the media guidance application may receive (e.g., via control circuitry 904 (FIG. 9)) the user selection. In general, the second user selection may be made using any convenient user input interface (e.g., user input interface 910).

Process 1600 continues to 1612, where the media guidance application generates for display (e.g., via control circuitry 904 (FIG. 9)) a second portion of the media asset associated with the entity in response to receiving the second user selection. For example, if the second user selection indicated a particular segment of the region associated with the "Dancing Scene" portion of the film "Romeo and Juliet in Paris," the media guidance application may generate a display to be presented to the user that includes the "Dancing Scene" portion of the film.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. Furthermore, it should be noted that any of the devices or equipment discussed in relation to FIG. 9 or FIG. 10 or the databases or data structures discussed in relation to FIGS. 2-5 could be used to perform one or more of the steps in FIG. 16.

Figure 17:
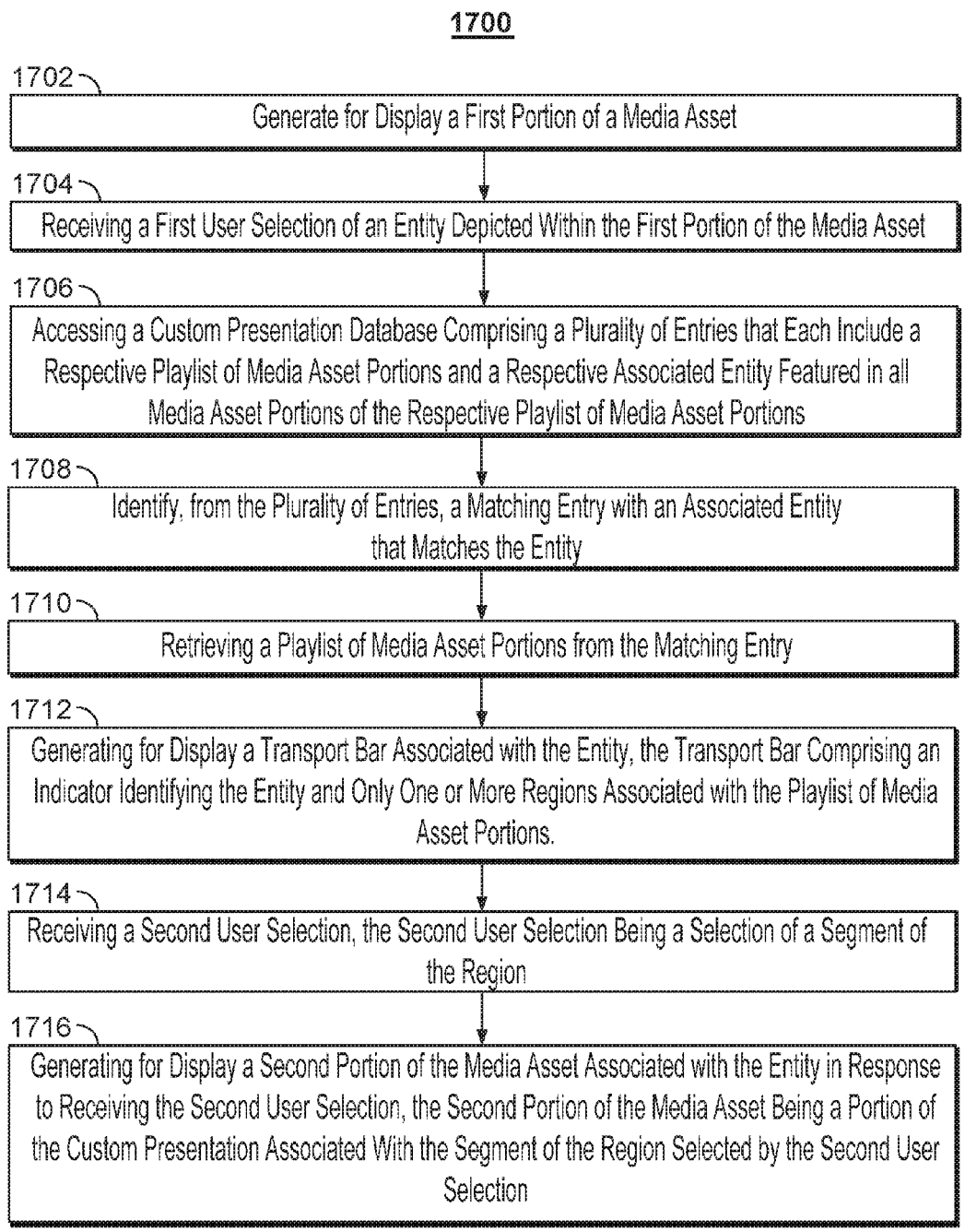
FIG. 17 is a flowchart of another set of illustrative steps for viewing and navigating customized media presentations, in accordance with some embodiments of the disclosure.

FIG. 17 is a flowchart of illustrative steps for viewing and navigating customized media presentations, in accordance with some embodiments of the disclosure. For example, a media guidance application implementing process 1700 may be executed by control circuitry 904 (FIG. 9). It should be noted that process 1700 or any portion thereof could be performed on, or be provided by, any of the devices discussed in relation to FIG. 9 or FIG. 10, and utilize any of the databases or data structures discussed in relation to FIGS. 2-5. It should also be noted that process 1700 or any of the individual procedures discussed in relation to process 1600 may be combined with any of the other processes in this disclosure, including the processes discussed in relation to FIGS. 12-16. For example, individual procedures discussed in relation to process 1700 may be combined, in whole or in part, with portions of process 1600 (FIG. 16).

Process 1700 begins at 1702, where the media guidance application generates for display (e.g., via control circuitry 904 (FIG. 9)) a first portion of a media asset (e.g., may generate a display of a portion of a film within content display area 122 of display screen 100 (FIG. 1)). In general, the first portion of the media asset may be displayed by the media guidance application concurrently with any number of other menus, overlays, or other graphics (e.g., the transport bars 102A and 102B and message region 124). The media guidance application may also generate displays of menus, overlays, or other graphics in response to user input (e.g., input received by a media guidance application from user input interface 910 (FIG. 9)).

Process 1700 continues to 1704, where the media guidance application receives (e.g., via control circuitry 904 (FIG. 9)) a first user selection (e.g., via user input interface 910 (FIG. 9)) of an entity depicted within the first portion of the media asset. For example, if the media asset is the film "Romeo and Juliet in Paris," featuring the character "Romeo," the media guidance application may receive a user selection of the entity "Romeo." In general, this user selection may be made in the form of verbal input, a user gesture, visual input, text, a keyboard selection, a mouse selection, a remote control selection, or the like. For instance, the media guidance application may access a camera implemented as part of user input interface 910, and detect a user selecting an entity by pointing at the entity being displayed, or gesturing in the direction of the entity being displayed.

In some embodiments, the media guidance application may receive (e.g., via control circuitry 904 (FIG. 9)) the first user selection by receiving a user input. For example, the user input may be in the form of a verbal command spoken by the user into a microphone connected to user equipment (e.g., a microphone included as part of a voice recognition interface of user input interface 910 (FIG. 9)). The media guidance application may then determine (e.g., via control circuitry 904 (FIG. 9)) a string of text associated with the user input. For example, the media guidance application may convert the audio of the user's verbal command to a string of text by using a suitable speech recognition technique, and determine that the verbal command corresponds to the string of text "show me more of Romeo." In general, any of the techniques described in relation to FIG. 13 for converting images or audio to text may be applied to the user input by the media guidance application. The media guidance application may then compare the string of text to entries in an entity database (e.g., database 300 (FIG. 3)), each of the entries comprising an associated entity and at least one descriptor of the associated entity (e.g., as indicated by information fields 304 and 306 of database 300 (FIG. 3)). For example, the media guidance application may compare the string of text "show me more of Romeo" to entity entries 310-318 in database 300. The media guidance application may then, in response to determining that at least a portion of the string of text matches at least a portion of the at least one descriptor of a matching entry, determine the associated entity of the matching entry is the entity selected. For instance, if the media guidance application determines that the string of text "show me more of Romeo" partially matches a descriptor, "Romeo," for entity entry 310 in database 300 (FIG. 3), the media guidance application may determine that the first user selection was a selection of the entity "Romeo" associated with entity entry 310 in database 300. In general, the media guidance application may use any of the information contained in the entity database (e.g., database 300 (FIG. 3)), as well as any metadata about the entities represented by entries in the database, in order to determine the identity of the entity in the first user selection.

Process 1700 continues to 1706, where the media guidance application accesses (e.g., via control circuitry 904 (FIG. 9)) a custom presentation database comprising a plurality of entries that each include a respective playlist of media asset portions (e.g., a playlist similar to presentation playlist 512 of custom presentation 500 (FIG. 5)) and a respective associated entity featured in all media asset portions of the respective playlist of media asset portions (e.g., similar to associated entity information fields 510 associated with custom presentation 500 (FIG. 5)). For example, if the first user selection was a selection of the entity "Romeo," the media guidance application may access a custom presentation database (e.g., a database with entries that each include similar information as custom presentation 500 (FIG. 5)). In general, each entry in the database may contain a listing of entities associated with the custom presentation (e.g., similar to associated entity information fields 510 associated with custom presentation 500 (FIG. 5)), and a playlist of media asset portions that feature that entity (e.g., a playlist similar to presentation playlist 512 of custom presentation 500 (FIG. 5)). For example, one entry may represent custom presentation 500 associated with the entity "Romeo" and the entity "Juliet," and include a playlist of portions of the film "Romeo and Juliet in Paris" that feature both the entity "Romeo" and the entity "Juliet."

Process 1700 continues to 1708, where the media guidance application identifies (e.g., via control circuitry 904 (FIG. 9)), from the plurality of entries, a matching entry with an associated entity that matches the entity. For example, if the first user selection was a selection of the entity "Romeo," the media guidance application may identify an entry representing a custom presentation (e.g., custom presentation 500 (FIG. 5)) associated with the entity "Romeo."

Process 1700 continues to 1710, where the media guidance application retrieves (e.g., via control circuitry 904 (FIG. 9)), a playlist of media asset portions (e.g., a playlist similar to presentation playlist 512 of custom presentation 500 (FIG. 5)) from the matching entry. For example, if the identified entry represented a custom presentation (e.g., custom presentation 500 (FIG. 5)) associated with the entity "Romeo," the media guidance application may retrieve a playlist of media asset portion (e.g., presentation playlist 512 (FIG. 5)) of the film "Romeo and Juliet in Paris" that features the entity "Romeo" from within the entry.

In some embodiments, the media asset is a first media asset, and at least one of the media asset portions of the playlist of media asset portions is associated with a second media asset distinct from the first media asset. For example, the media guidance application may retrieve (e.g., via control circuitry 904 (FIG. 9)) a playlist from the entry (e.g., playlist similar to presentation playlist 512 (FIG. 5)) that includes asset portion entries (e.g., asset portion entries 522-526 (FIG. 5)) representing portions of the film "Romeo and Juliet in Paris" featuring the entity "Romeo," as well as asset portion entries representing portions of the film "Romeo and Juliet in London," also featuring the entity "Romeo."

Process 1700 continues to 1712, where the media guidance application generates for display (e.g., via control circuitry 904 (FIG. 9)), a transport bar associated with the entity, the transport bar comprising an indicator identifying the entity and only one or more regions associated with the playlist of media asset portions (e.g., indicator 106A and region 108A of transport bar 102A (FIG. 1)). For example, the media guidance application may display a transport bar (e.g., transport bar 102A (FIG. 1)) associated with the entity "Romeo," which is a character in the film "Romeo and Juliet in Paris." The displayed transport bar may include an indicator (e.g., indicator 106A of transport bar 102A (FIG. 1)) identifying the entity "Romeo" through the use of the name of the character, an image of the character's face, an image of a distinguishing feature of the character such as his clothing or accessories, a color-coded highlight region matching a highlight region presented around the character in the media asset, or any other suitable type of visual indicator. In general, the one or more regions (e.g., region 108A of transport bar 102A (FIG. 1)) may represent the portions of the media asset in the playlist of media asset portions, and may allow the user to navigate to different media asset portions.

In some embodiments, the region comprises a plurality of sub-regions (e.g., sub-region 110A of region 108A of transport bar 102A (FIG. 1)), each of the sub-regions being associated with a respective one of the media asset portions of the playlist of media asset portions. For example, there may be a first sub-region associated with a first media asset portion, and a second sub-region associated with the second media asset portion. In general, the media guidance application may visually distinguish between the different sub-regions. For example, the media guidance application may generate a display (e.g., via control circuitry 904 (FIG. 9)) of a first sub-region in a first color, and a second sub-region in a second color different from the first color.

In some embodiments, the plurality of entries each include a respective indication of a transport bar display style, and the media guidance application may generate the display of the transport bar (e.g., transport bar 102A (FIG. 1)) by retrieving an indication of a transport bar display style from the matching entry. For example, the custom presentation associated with the entity "Romeo," may include information indicating that a transport bar associated with the custom presentation is to be displayed as a thin bar with a red border, and the name of the entity "Romeo" indicated using large lettering. The media guidance application then generates for display the transport bar (e.g., transport bar 102A (FIG. 1)) based on the indication of the transport bar display style, wherein the transport bar display style indicates at least one of a color, shape, or font to be associated with the transport bar. For instance, the media guidance application may generate a display of a transport bar (e.g., transport bar 102A (FIG. 1)) based on the identified custom presentation associated with the entity "Romeo" by displaying the transport bar as a thin bar with a red border, and the name of the entity "Romeo" indicated using the large lettering, as indicated in the entry associated with the custom presentation in the custom presentation database.

In some embodiments, when the region comprises a plurality of sub-regions (e.g., sub-region 110A of region 108A of transport bar 102A (FIG. 1)), the media guidance application generates for display (e.g., via control circuitry 904 (FIG. 9)) the transport bar (e.g., transport bar 102A (FIG. 1)) by determining a respective asset portion display style for each of the media asset portions in the playlist of media asset portions from the matching entry. For example, within the entry in the custom presentation database for the custom presentation associated with the entity "Romeo" there may be information indicating that a sub-region of the transport bar associated with the "Dancing Scene" portion of the media asset is to be displayed as a green bar, and another portion of the media asset is to be displayed as a different color bar. In general, the different colors may represent different types of content displayed in a given portion of the media asset. For example, violent content may be represented by a first color, romantic content by a second color, and content with explicit language indicated by a third color. The media guidance application may then generate for display (e.g., via control circuitry 904 (FIG. 9)) the transport bar comprising the plurality of sub-regions (e.g., transport bar 102A (FIG. 1)), the display of each of the sub-regions being based on the respective asset portion display style, wherein each of the respective asset portion display styles indicates at least one of a color, shape, or font to be associated with a respective sub-region. For example, the media guidance application may generate a display (e.g., via control circuitry 904 (FIG. 9)) of transport bar 102 (FIG. 1), and display sub-region 110A of the transport bar 102 associated with the "Dancing Scene" using the green bar, as indicated in the entry from the custom presentation database.

In some embodiments, the media guidance application determines (e.g., via control circuitry 904 (FIG. 9)) the respective asset portion display style for each of the media asset portions by determining, for each of the media asset portions, a respective type of activity involving the entity depicted by the media asset portion. For example, the media guidance application may determine (e.g., via control circuitry 904 (FIG. 9)) if a given portion of the media asset involves characters fighting, dancing, engaging in romantic activities, engaging in dialogue, or the like, and the media guidance application may be configured to automatically associate these different types of content with different asset portion display styles. The media guidance application may then determine (e.g., via control circuitry 904 (FIG. 9)), for each of the media asset portions, the asset portion display style based on the respective type of activity involving the entity. For example, the media guidance application may determine (e.g., via control circuitry 904 (FIG. 9)) that the "Dancing Scene" portion of the film "Romeo and Juliet in Paris" is to be associated with a sub-region of the transport bar displayed as a green bar with curly letting indicating the name of the portion, while another portion of the media asset featuring the death of the entity "Romeo" is to be displayed as a dark purple bar with gothic lettering indicating the name of that other portion. In general, the media guidance application may use any suitable source of metadata (e.g., media guidance data source 1018 (FIG. 10) or database 400 (FIG. 4)) in order to determine the content being presented in a given portion of the media asset. For example, portions of the media asset containing violent content may be indicated by an information field within an asset portion database (e.g., database 400 (FIG. 4)).

In some embodiments, the media guidance application determines (e.g., via control circuitry 904 (FIG. 9)) the respective asset portion display style for each of the media asset portions by determining, for each of the media asset portions, whether a respective media asset portion is available from a content provider. For example, the media guidance application may determine (e.g., via control circuitry 904 (FIG. 9)) if a given portion of the media asset is available from a particular content source, such as a digital video recorder within the user's home, or from a particular OTT content provider such as NETFLIX or HULU. The media guidance application may then determine a first asset portion display style (e.g., via control circuitry 904 (FIG. 9)) for the respective media asset portion in response to determining that the respective media asset portion is available from the content provider. For instance, the media guidance application may determine that the available media asset portions are to be displayed as a green bar when they are available from a digital video recorder within the user's home, and a red bar when they are available to be ordered from an OTT content provider. Alternately, the media guidance application may determine a second asset portion display style for the respective media asset portion in response to determining that the respective media asset portion is not available from the content provider. For instance, the media guidance application may determine that the media asset portions that are not available are to be displayed as a greyed out bar within the region (e.g., within the region 108A of transport bar 102A (FIG. 1)). In this case, the user may be prevented from selecting the portions of the region that are greyed out, and the media guidance application may respond to attempts to select those portions of the region by displaying an alert to the use that those portions are unavailable.

In some embodiments, the entity is a first entity, the matching entry is a first matching entry, the playlist of media asset portions is a first playlist of media asset portions, the transport bar is a first transport bar, and the media guidance application receives (e.g., via control circuitry 904 (FIG. 9)) an additional user selection (e.g., a selection made via user input interface 910 (FIG. 9)) of a second entity depicted within the first portion of the media asset. For example, the media guidance application may receive an additional user selection (e.g., a selection made via user input interface 910 (FIG. 9)) of the entity "Juliet," in addition to the first user selection of the entity "Romeo." In response to receiving the additional user selection, the media guidance application may identify (e.g., via control circuitry 904 (FIG. 9)), from a plurality of entries of the custom presentation database, a second matching entry with a first associated entity that matches the first entity, and a second associated entity that matches the second entity. For example, the media guidance application may select (e.g., via control circuitry 904 (FIG. 9)) an entry associated within the database that is associated with both the entity "Romeo" and the entity "Juliet." In general, this may correspond to a custom presentation (e.g., custom presentation 500 (FIG. 5)) with a playlist of media asset portions that feature both the entity "Romeo" and the entity "Juliet." The media guidance application may then retrieve (e.g., via control circuitry 904 (FIG. 9)) a second playlist of media asset portions from the second matching entry. For example, the media guidance application may retrieve the playlist of media asset portions that feature both the entity "Romeo" and the entity "Juliet" from the second matching entry. The media guidance application may then generate for display (e.g., via control circuitry 904 (FIG. 9)) a second transport bar associated with both the first entity and the second entity, the second transport bar comprising an indicator identifying both the first entity and the second entity, and only one or more regions associated with the second playlist of media asset portions (e.g., indicator 106A and region 108A of transport bar 102A (FIG. 1)). For example, the media guidance application may display a transport bar that includes an indicator identifying both "Romeo" and "Juliet," and a region representing the portions of the film "Romeo and Juliet in Paris" in the second playlist, which feature both of the entities "Romeo" and "Juliet."

Process 1700 continues to 1714, where the media guidance application receives (e.g., via control circuitry 904 (FIG. 9)), a second user selection (e.g., a selection made via user input interface 910 (FIG. 9)), the second user selection being a selection of a segment of the region. For example, a user may use a mouse, keyboard, remote control, voice commands, gestures, or other suitable input to select a segment of the region. For example, the user may verbally indicate a segment of the region to be selected, and the media guidance application may parse the input (e.g., using a suitable speech recognition technique) in order to determine the selected segment of the region. In general, any of the techniques described in relation to FIG. 13 for converting images or audio to text may be applied to the user input by the media guidance application, as may any other suitable voice or image recognition technique.

Process 1700 continues to 1716, where the media guidance application generates for display (e.g., via control circuitry 904 (FIG. 9)), a second portion of the media asset associated with the entity in response to receiving the second user selection (e.g., a selection made via user input interface 910 (FIG. 9)), the second portion of the media asset being a portion of the custom presentation associated with the segment of the region selected by the second user selection. For example, if the second user selection indicated a segment of the region associated with the "Dancing Scene" portion of the film "Romeo and Juliet in Paris," (e.g., sub-region 110A of region 108A of transport bar 102A (FIG. 1)) the media guidance application may generate a display to be presented to the user that includes the "Dancing Scene" portion of the film.

In some embodiments, when the region includes a plurality of sub-regions (e.g., sub-region 110A of region 108A of transport bar 102A (FIG. 1)), the second user selection indicates one of the plurality of sub-regions. For example, the second user selection may indicate a particular sub-region associated with a given portion of the media asset, such as sub-region 110A associated with the "Dancing Scene" portion of the film "Romeo and Juliet in Paris." In this case, the second portion of the media asset may be associated with the sub-region indicated by the second user selection. For example, the second portion of the media asset displayed by the media guidance application (e.g., within content display area 122 of display screen 100 (FIG. 1)) may be the "Dancing Scene" portion of the film "Romeo and Juliet in Paris."

In some embodiments, the media guidance application generates the display (e.g., via control circuitry 904 (FIG. 9)) of the second portion of the media asset by determining (e.g., via control circuitry 904 (FIG. 9)) a content source associated with the second portion of the media asset. For example, the media guidance application may determine (e.g., via control circuitry 904 (FIG. 9)) that second portion of the media asset is accessible from a digital video recorder located within a user's home, or from an over-the-top (OTT) content provider such as HULU or NETFLIX. The media guidance application may then retrieve the second portion of the media asset from the content source. For instance, if the media guidance application determined that the second portion of the media asset is available from the OTT content provider HULU, the media guidance application may retrieve the second portion of the media asset from the OTT content provider HULU. The media guidance application may then generate for display (e.g., via control circuitry 904 (FIG. 9)) the second portion of the media asset. For example, after retrieving the appropriate video files from the OTT content provider HULU, the media guidance application may use those files in order to generate a display of the second portion of the media asset for user consumption (e.g., by displaying the portion of the media asset within content display area 122 of display screen 100 (FIG. 1)).

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. Furthermore, it should be noted that any of the devices or equipment discussed in relation to FIG. 9 or FIG. 10 or the databases or data structures discussed in relation to FIGS. 2-5 could be used to perform one or more of the steps in FIG. 17.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for presenting navigation options comprising:

generating for display a first portion of a media asset;

searching, using data indicative of the media asset, a message database to identify a plurality of messages associated with the media asset;

searching, using message content from the plurality of messages, an entity database to identify a set of entities referenced in the plurality of messages;

determining, for the set of entities, a set of frequencies indicative of how often each entity in the set of entities is referenced in the plurality of messages;

selecting, from the set of entities, an entity frequently referenced in the plurality of messages;

identifying, using a media asset portion database, one or more portions of the media asset associated with the entity;

generating a custom presentation of the media asset by arranging the one or more portions of the media asset associated with the entity in an order;

generating for display a transport bar associated with the entity, the transport bar comprising an indicator identifying the entity and only one or more regions associated with the custom presentation;

receiving a user selection of a segment of the region; and generating for display a second portion of the media asset associated with the entity in response to receiving the user selection, the second portion of the media asset being a portion of the custom presentation associated with the segment of the region selected.

2. The method of claim 1, wherein:

the region comprises a plurality of sub-regions, each of the sub-regions being associated with a different portion of the media asset within the custom presentation;

the user selection of the segment of the region indicates one of the plurality of sub-regions; and the second portion of the media asset is associated with the sub-region indicated by the user selection.

3. The method of claim 1, wherein the identifying one or more portions of the media asset associated with the entity comprises:

accessing the media asset portion database, entries in the media asset portion database comprising an associated portion of the media asset, a start time of the associated portion, an end time of the associated portion, and a list of entities depicted in the associated portion;

selecting a plurality of entries from the media asset portion database, each of the selected entries comprising the entity in the list of entities; and selecting, as the one or more portions of the media asset associated with the entity, associated portions of the media asset from the plurality of entries selected.

4. The method of claim 1, wherein the identifying one or more portions of the media asset associated with the entity comprises:

accessing a database of media asset playlists, each entry in the database comprising an associated playlist of media asset portions, and a list of entities depicted in the media asset portions;

selecting, from the database, an entry, wherein the entity is included in the list of entities of the entry selected; and identifying media asset portions within the associated playlist of the entry selected as the one or more portions of the media asset associated with the entity.

5. The method of claim 1, wherein the searching the entity database comprises:

identifying strings of text associated with the message content from the plurality of messages;

comparing the strings of text to entries in the entity database, each of the entries comprising an associated entity and at least one descriptor of the associated entity; and including the associated entity of an entry in the set of entities in response to determining that at least a portion of the strings of text match at least a portion of the at least one descriptor of the entry.

6. The method of claim 1, wherein the determining the set of frequencies comprises:

identifying strings of text associated with the message content from the plurality of messages;

determining, for each entity in the set of entities, a number of the strings of text that include a descriptor of the entity; and assigning, for each entity in the set of entities, a frequency in the set of frequencies based on the number.

7. The method of claim 1, wherein the selecting comprises:

identifying, from the set of entities, a subset of entities presented in the first portion of the media asset; and selecting the entity from the subset of entities.

8. The method of claim 1, wherein the media asset is a first media asset, and further comprising:

identifying, using a media asset portion database, one or more portions of a second media asset associated with the entity;

generating a second custom presentation of the second media asset by arranging the one or more portions of the second media asset associated with the entity in a second order; and generating for display a second transport bar associated with the entity, the second transport bar comprising the indicator identifying the entity and a second region associated with only the second custom presentation.

9. The method of claim 8, further comprising:

generating a third custom presentation by arranging the one or more portions of the first media asset and the one or more portions of the second media asset in a third order; and generating for display a third transport bar associated with the entity, the third transport bar comprising the indicator identifying the entity and a third region associated with only the third custom presentation.

10. The method of claim 1, wherein the entity is a first entity, and further comprising:

selecting, from the set of entities, a second entity frequently referenced in the plurality of messages;

identifying, using the media asset portion database, one or more portions of the media asset associated with both the first entity and the second entity;

generating a second custom presentation of the media asset by arranging the one or more portions of the media asset associated with both the first entity and the second entity in a second order; and generating for display a second transport bar associated with both the first entity and the second entity, the second transport bar comprising a second indicator identifying both the first entity and the second entity and a second region associated with only the second custom presentation.

11. A system for presenting navigation options, the system comprising:

storage circuitry; and control circuitry configured to:

generate for display a first portion of a media asset;

search, using data indicative of the media asset, a message database to identify a plurality of messages associated with the media asset;

search, using message content from the plurality of messages, an entity database to identify a set of entities referenced in the plurality of messages;

determine, for the set of entities, a set of frequencies indicative of how often each entity in the set of entities is referenced in the plurality of messages;

select, from the set of entities, an entity frequently referenced in the plurality of messages;

identify, using a media asset portion database, one or more portions of the media asset associated with the entity;

generate a custom presentation of the media asset by arranging the one or more portions of the media asset associated with the entity in an order;

generate for display a transport bar associated with the entity, the transport bar comprising an indicator identifying the entity and only one or more regions associated with the custom presentation;

receive a user selection of a segment of the region; and generate for display a second portion of the media asset associated with the entity in response to receiving the user selection, the second portion of the media asset being a portion of the custom presentation associated with the segment of the region selected.

12. The system of claim 11, wherein:

the region comprises a plurality of sub-regions, each of the sub-regions being associated with a different portion of the media asset within the custom presentation;

the user selection of the segment of the region indicates one of the plurality of sub-regions; and the second portion of the media asset is associated with the sub-region indicated by the user selection.

13. The system of claim 11, wherein the control circuitry is configured to identify one or more portions of the media asset associated with the entity by being configured to:

access the media asset portion database, entries in the media asset portion database comprising an associated portion of the media asset, a start time of the associated portion, an end time of the associated portion, and a list of entities depicted in the associated portion;

select a plurality of entries from the media asset portion database, each of the selected entries comprising the entity in the list of entities; and select, as the one or more portions of the media asset associated with the entity, associated portions of the media asset from the plurality of entries selected.

14. The system of claim 11, wherein the control circuitry is configured to identify one or more portions of the media asset associated with the entity by being configured to:

access a database of media asset playlists, each entry in the database comprising an associated playlist of media asset portions, and a list of entities depicted in the media asset portions;

select, from the database, an entry, wherein the entity is included in the list of entities of the entry selected; and identify media asset portions within the associated playlist of the entry selected as the one or more portions of the media asset associated with the entity.

15. The system of claim 11, wherein the control circuitry is configured to search the entity database by being configured to:

identify strings of text associated with the message content from the plurality of messages;

compare the strings of text to entries in the entity database, each of the entries comprising an associated entity and at least one descriptor of the associated entity; and include the associated entity of an entry in the set of entities in response to determining that at least a portion of the strings of text match at least a portion of the at least one descriptor of the entry.

16. The system of claim 11, wherein the control circuitry is configured to determine the set of frequencies by being configured to:

identify strings of text associated with the message content from the plurality of messages;

determine, for each entity in the set of entities, a number of the strings of text that include a descriptor of the entity; and assign, for each entity in the set of entities, a frequency in the set of frequencies based on the number.

17. The system of claim 11, wherein the control circuitry is configured to select by being configured to:

identify, from the set of entities, a subset of entities presented in the first portion of the media asset; and select the entity from the subset of entities.

18. The system of claim 11, wherein the media asset is a first media asset, and the control circuitry is further configured to:

identify, using a media asset portion database, one or more portions of a second media asset associated with the entity;

generate a second custom presentation of the second media asset by arranging the one or more portions of the second media asset associated with the entity in a second order; and generate for display a second transport bar associated with the entity, the second transport bar comprising the indicator identifying the entity and a second region associated with only the second custom presentation.

19. The system of claim 18, wherein the control circuitry is further configured to:

generate a third custom presentation by arranging the one or more portions of the first media asset and the one or more portions of the second media asset in a third order; and generate for display a third transport bar associated with the entity, the third transport bar comprising the indicator identifying the entity and a third region associated with only the third custom presentation.

20. The system of claim 11, wherein the entity is a first entity, and the control circuitry is further configured to:

select, from the set of entities, a second entity frequently referenced in the plurality of messages;

identify, using the media asset portion database, one or more portions of the media asset associated with both the first entity and the second entity;

generate a second custom presentation of the media asset by arranging the one or more portions of the media asset associated with both the first entity and the second entity in a second order; and generate for display a second transport bar associated with both the first entity and the second entity, the second transport bar comprising a second indicator identifying both the first entity and the second entity and a second region associated with only the second custom presentation.

* * * * *